United States Patent
Li et al.

(10) Patent No.: US 12,453,502 B2
(45) Date of Patent: Oct. 28, 2025

(54) CONDUCTING SILK-BASED ELECTRODES

(71) Applicant: Nanyang Technological University, Singapore (SG)

(72) Inventors: Qingsong Li, Singapore (SG); Geng Chen, Singapore (SG); Xiaodong Chen, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 870 days.

(21) Appl. No.: 17/603,782

(22) PCT Filed: Jun. 12, 2020

(86) PCT No.: PCT/SG2020/050330
§ 371 (c)(1),
(2) Date: Oct. 14, 2021

(87) PCT Pub. No.: WO2020/251474
PCT Pub. Date: Dec. 17, 2020

(65) Prior Publication Data
US 2022/0192570 A1   Jun. 23, 2022

(30) Foreign Application Priority Data
Jun. 12, 2019   (SG) .......................... 10201905320R

(51) Int. Cl.
*A61B 5/268* (2021.01)
*D06M 13/148* (2006.01)
(Continued)

(52) U.S. Cl.
CPC .......... *A61B 5/268* (2021.01); *D06M 13/148* (2013.01); *D06M 15/3562* (2013.01);
(Continued)

(58) Field of Classification Search
CPC ............ A61B 5/268; A61B 2562/0209; A61B 2562/125; A61B 5/27; D06M 13/148;
(Continued)

(56) References Cited

U.S. PATENT DOCUMENTS

2011/0223153 A1   9/2011   Lu et al.
2014/0303470 A1*  10/2014  Tsukada ................. H01B 1/127
                                              428/394
(Continued)

FOREIGN PATENT DOCUMENTS

CN          106046390 A  * 10/2016  ............. A61L 27/22
WO     WO-2012145652 A1 * 10/2012  ............. A61B 5/291
(Continued)

OTHER PUBLICATIONS

Kayser, L. V., & Lipomi, D. J. (2019). Stretchable conductive polymers and composites based on PEDOT and PEDOT:PSS. Advanced Materials (Deerfield Beach, Fla.), 31(10). https://doi.org/10.1002/adma.201806133 (Year: 2019).*
(Continued)

*Primary Examiner* — Joanne M Rodden
*Assistant Examiner* — Dana Stumpfoll
(74) *Attorney, Agent, or Firm* — Thomas Horstemeyer, LLP

(57) ABSTRACT

Disclosed herein is an electrode material comprising: a non-woven silk-fibroin mesh substrate; glycerol; and a conductive polymeric material, wherein 40-65% of the silk-fibroin in the non-woven mesh substrate is in the form of β-sheets, and the electrode material is stretchable. Also disclosed herein is a method of forming said electrode material.

11 Claims, 9 Drawing Sheets

(51) Int. Cl.
*D06M 15/356* (2006.01)
*D06M 101/12* (2006.01)

(52) U.S. Cl.
CPC . *D06M 15/3566* (2013.01); *A61B 2562/0209* (2013.01); *A61B 2562/125* (2013.01); *D06M 2101/12* (2013.01)

(58) Field of Classification Search
CPC ......... D06M 15/3562; D06M 15/3566; D06M 2101/12
See application file for complete search history.

(56) References Cited

U.S. PATENT DOCUMENTS

| | | | | |
|---|---|---|---|---|
| 2015/0335288 | A1* | 11/2015 | Toth | A61B 5/6833 |
| | | | | 600/391 |
| 2016/0310032 | A1* | 10/2016 | Sotzing | A61B 5/6804 |
| 2018/0014780 | A1* | 1/2018 | Sotzing | A61B 5/25 |
| 2019/0290501 | A1* | 9/2019 | LaVon | A61F 13/51401 |

FOREIGN PATENT DOCUMENTS

| | | | | |
|---|---|---|---|---|
| WO | WO-2016148249 | A1 * | 9/2016 | A61B 5/0408 |
| WO | WO-2020160510 | A1 * | 8/2020 | A61B 5/256 |

OTHER PUBLICATIONS

Jin, H., Matsuhisa, N., Lee, S., Abbas, M., Yokota, T., & Someya, T. (2017). Enhancing the performance of stretchable conductors for E-textiles by controlled ink permeation. Advanced Materials (Deerfield Beach, Fla.), 29(21). https://doi.org/10.1002/adma.201605848 (Year: 2017).*
F. Wang, Measurements of clothing evaporative resistance using a sweating thermal manikin: an overview, Ind. Health, vol. 55, No. 6, pp. 473-484, 2017. (Year: 2017).*
J. E. Brown et al., "Thermal and structural properties of silk biomaterials plasticized by glycerol," Biomacromolecules, vol. 17, No. 12, pp. 3911-3921, 2016. (Year: 2016).*
S. W. Hwang et al., Science 2012, 337, 1640.
Y. Zhang, T. H. Tao, Adv. Mater. 2019, 31, 1905767.
P. Tseng et al., Adv. Mater. 2018, 30, 1703257.
T. J. Jia et al., Adv. Funct. Mater. 2019, 29, 1808241.
Z. Jiang et al., Adv. Mater. 2019, 31, 1903446.
J. Maksimcuka et al., Front. Mater. 2017, 4, 43.
M. Zhang et al., J. Appl. Mech. 2019, 86, 011010.
C. Vepari and D. L. Kaplan, Prog. Polym. Sci., 2007, 32, 991-1007.
C. Y. Jiang et al., Adv Funct Mater, 2007, 17, 2229-2237.
L. D. Koh et al., Prog Polym Sci, 2015, 46, 86-110.
Q. Lu et al., Acta Biomater, 2010, 6, 1380-1387.
D. Huemmerich, U. Slotta and T. Scheibel, Applied Physics A, 2006, 82, 219-222.
D. L. Kaplan et al., in Protein-Based Materials, 1997, Chapter 4, pp. 103-131.
S. Ling et al., Lab Chip, 2016, 16, 2459-2466.
H. Yuk et al., Nat Commun, 2016, 7, 12028.
B. Zhu et al., Small, 2014, 10, 3625-3631.
V. Agostini and M. Knaflitz, IEEE Trans Biomed Eng, 2012, 59, 219-225.
S. A. Fossey et al., Biopolymers, 1991, 31, 1529-1541.
E. F. Pettersen et al., J Comput Chem, 2004, 25, 1605-1612.
T. Darden et al., J Chem Phys, 1993, 98, 10089-10092.
W. Humphrey et al., J Mol Graph, 1996, 14, 33-38, 27-38.
B. Zhu et al., Adv Mater, 2016, 28, 4250-4265.
E. Steven et al., Nat. Commun. 2013, 4, 2435.
C. X. Liang and K. Hirabayashi, J Appl Polym Sci, 1992, 45, 1937-1943.
K. Kesenci et al., Journal of Biomaterials Science, Polymer Edition, 2012, 12, 337-351.
B. P. Partlow et al., Adv Funct Mater, 2014, 24, 4615-4624.
G. A. Holzapfel, in Thw handbook of materials behavior models, 2000, ch. 10, p. 1049 Uploaded.
X. Chen, Small Methods, 2017, 1, 1600029.
J. Perez-Rigueiro et al., J Appl Polym Sci, 2000, 75, 1270-1277.
S. Keten et al., Nat Mater, 2010, 9, 359-367.
C. Xu et al., Acta Mechanica Sinica 2015, 31, 416-424.
S. Isabelle and J. B. Markus, Nanotechnology, 2016, 27, 302001.
S. Y. Sheu et al., Proc Natl Acad Sci U S A 2003, 100, 12683-12687.
F. Zhang et al., ACS Appl Mater Interfaces, 2015, 7, 3352-3361.
H. J. Jin et al., Adv Funct Mater, 2005, 15, 1241-1247.
E. R. Morris et al., Carbohydrate Research, 1978, 66, 145-154.
F. Wang et al., Journal of Thermal Analysis and Calorimetry, 2017, 130, 851-859.
C. J. Fu et al., Macromolecules, 2009, 42, 7877-7880.
M. Kyungtaek et al., Nanotechnology, 2017, 28, 115201.
O. Graudejus et al., Scr Mater, 2012, 66, 919-922.
T. Li et al., Appl Phys Lett, 2004, 85, 3435-3437.
S. Zeng et al., Adv Mater, 2017, 29, 1700828.
S. P. Lacour et al., Appl Phys Lett, 2003, 82, 2404-2406.
J. J. Norton et al., Proc Natl Acad Sci U S A, 2015, 112, 3920-3925.
H. Yuk, B. Lu and X. Zhao, Chem Soc Rev, 2019, 48, 1642-1667.
P. Leleux et al., Adv Healthc Mater, 2014, 3, 1377-1380.
S. Choi et al., Adv Mater, 2016, 28, 4203-4218.
J. A. Johnson and R. M. Fusaro, in Advances in Metabolic Disorders, eds. R. Levine and R. Luft, Elsevier, 1972, vol. 6, pp. 1-55.
J. Jin et al., Adv Mater, 2016, 28, 5169-5175.
H. Zhu et al., Chem Rev, 2016, 116, 9305-9374.
M. Irimia-Vladu, Chem Soc Rev, 2014, 43, 588-610.
B. O'Connell, Oval Profile Plot.
G. Chen, et al. Adv. Mater. 2018, 30, 1800129.
D. Van Der Spoel, et al. J. Comput. Chem. 2005, 26, 1701.
C. Z. Zhou, et al. Proteins 2001, 44, 119-122.
W. L. Jorgensen, et al. J. Chem. Phys. 1983, 79, 926-935.
H. J. C. Berendsen, et al. J. Chem. Phys. 1984, 81, 3684-3690.
M. Heinig, D. Frishman, Nucleic Acids Res. 2004, 32, W500-502.
C. Ayres, et al. Biomaterials 2006, 27, 5524-5534.
D. Li, et al. Nano Lett. 2003, 3, 1167-1171.
H. J. Jin, et al. Biomacromolecules 2004, 5, 711-717.
J. H. Lee, et al. ACS Appl Mater Interfaces 2018, 10, 28027.
S. Cruz, et al. J Mater Sci-Mater EI 2017, 28, 2563.
J. G. Tait, et al. Sol. Energy Mater. Sol. Cells 2013, 110, 98.
K. Wang, et al. Adv Healthc Mater 2017, 6, 1700552.
A. Miyamoto, et al. Nat. Nanotechnol. 2017, 12, 907-913.
J. Test. Eval. 2007, 35, 100707.
G. Song, S. Mandal, in Performance Testing of Textiles: Methods, Technology and Applications (Ed: L. Wang), Woodhead Publishing, Oxford, United Kingdom 2016, Ch. 3.
Q. Qiu, et al. Nano Energy 2019, 58, 750-758.
M. Cao, et al. IEEE Comput. Graph. Appl. 2016, 36, 70-77.
J. Nikolovski, et al. J. Invest. Dermatol. 2008, 128, 1728-1736.
K. I. Jang, et al. Nat. Commun. 2014, 5, 4779.
S. Lu et al., Biomacromolecules 2010, 11, 143-150.
J. Pérez-Rigueiro, C. Viney, J. Llorca, M. Elices, Polymer 2000, 41, 8433-8439.
Y. Cheng et al., J. R. Soc. Interface 2014, 11, 20140305.
T. Seydel et al., Phys. Rev. E Stat. Nonlin. Soft Matter Phys. 2011, 83, 016104.
B. D. Lawrence et al., Macromol. Biosci. 2010, 10, 393-403.
Y. Wang et al., Soft Matter 2014, 10, 6321-6331.
H. J. Snaith et al., Polymer 2005, 46, 2573-2578.
M. R. Moraes et al., J. Mater. Chem. C 2017, 5, 3807-3822.
D. Son et al., Nat. Nanotechnol. 2018, 13, 1057.
D. H. Kim et al., Science 2011, 333, 838-843.
W. Lee et al., Sci. Adv. 2018, 4, eaau2426.
N. Matsuhisa, X. Chen, Z. Bao, T. Someya, Chem. Soc. Rev. 2019, 48, 2946.
S. Imani et al., Nat. Commun. 2016, 7, 11650.
I. Hwang et al., Adv. Healthc. Mater. 2018, 7, e1800275.
Q. Hua et al., Nat. Commun. 2018, 9, 244.
J. Kim et al., Nat. Biotechnol. 2019, 37, 389-406.
Y. Ma et al., Adv. Mater. 2020, 1902062.
H. U. Chung et al., Science 2019, 363, eaau0780.
T. Wang et al., Adv. Mater. 2020, 32, 1905522.

(56) References Cited

OTHER PUBLICATIONS

S. Niu et al., Nat. Electron. 2019, 2, 361.
A. Patriciu et al., IEEE Trans. Biomed. Eng. 2005, 52, 2024-2031.
W. Besio et al., Ann. Biomed. Eng. 2010, 38, 1111-1118.
Y. J. Fan et al., ACS Nano 2018, 12, 9326-9332.
B. Sun et al., Adv. Mater. 2018, 30, e1804327.
Q. Li, X. M. Tao, Proc. Math. Phys. Eng. Sci. 2014, 470, 20140472.
Y. Li, Textile Progress 2001, 31, 1.
D. Bhatia, U. Malhotra, J. Textile Sci. Eng. 2016, 6, 250.
C. Wang et al., Acc. Chem. Res. 2019, 52, 2916.
M. Jo et al., ACS Nano 2018, 12, 5637.
International Search Report mailed Sep. 30, 2020.
Written Opinion mailed Sep. 30, 2020.
Tsukada et al. "Conductive Polymer Combined Silk Fiber Bundle for Bioelectric Signal Recording"; Materials Science Laboratory, NTT Basic Research Laboratories, NTT Corporation, Atsugi, Kanagawa, Japan.
Rockwood et al. "Materials fabrication from Bombyx mori silk fibroin"; 1612 | vol. 6 No. 10 | 2011 | nature protocols.
Zheng et al. "Preparation of Regenerated Antheraea yamamai Silk Fibroin Film and Controlled-Molecular Conformation Changes by Aqueous Ethanol Treatment"; Published online Dec. 1, 2009 in Wiley InterScience (www.interscience.wiley.com).
Brown et al. "Thermal and Structural Properties of Silk Biomaterials Plasticized by Glycerol"; ACS Publications, 2016.
Cheng et al. "Experimental Methodology" Chapter 3; "Plasticized Silk Fibroin Films" Chapter 4; "Glycerol Plasticized Silk Fiber Mats" Chapter 5.

\* cited by examiner

CONDUCTING SILK-BASED ELECTRODES

CROSS-REFERENCE TO RELATED APPLICATION

This application is the 35 U.S.C. § 371 national stage application of PCT Application No. PCT/SG2020050330, filed Jun. 12, 2020, where the PCT claims priority to and the benefit of, SG Patent Application No. 10201905320R, filed Jun. 12, 2019, both of which are herein incorporated by reference in their entireties.

FIELD OF INVENTION

This invention relates to an electrode material comprising a non-woven silk-fibroin mesh substrate, glycerol and a conductive polymeric material, and a method of forming said material.

BACKGROUND

The listing or discussion of a prior-published document in this specification should not necessarily be taken as an acknowledgement that the document is part of the state of the art or is common general knowledge.

On-skin electronics, which interface between the skin and machine, are emerging as a trend in medical diagnostics and continuous health monitoring. Such devices, which include patchable electrodes and sensors, are often used for monitoring body temperature, detecting pulse and recording electrocardiography. To obtain high signal fidelity, such on-skin devices and sensors require good skin conformability, skin-like softness, high stretchability, and good biocompatibility. These characteristics are important to allow the devices to be suitable for use under all possible conditions in our daily life, and to reduce discomfort to the user due to long-term wearing.

Current technology based on thin-film electronics, which integrate stretchable elastomer and engineered active layer, has achieved skin-like softness, high stretchability and skin conformability. In addition, various kinds of sensors and electrodes (e.g. mechanical, photonic, and biochemical-based) have been developed using thinner and softer synthetic polymer substrates. However, such thin film devices have limited gas permeability, which reduces the water vapour transmission on the surface of skin. Further, the limited biocompatibility of these devices is also a concern.

Commercial electrodes for electrophysiological measurements mainly consist of a plastic cover, ionic hydrogel and carbon black conductive layer, in which all have low gas permeability. These devices can trap moisture on the skin surface, and interfere with normal skin functions, such as regulation of the body temperature and fluid balance. For long-term on-skin measurements, this can affect the skin conditions and morphologies, which increases the risk of skin inflammation and skin allergy. Besides gas permeability, thermal-wet comfort indices, such as thermal insulation and evaporative resistance, are also important parameters for determining the level of comfort of such electrodes, especially for long-term monitoring under wet conditions.

Given the above, there remains a need to develop materials that are stretchable, highly conductive, and at the same time have high gas permeability, thereby suitable for use in on-skin devices under dry/wet conditions. More importantly, these materials have to be biocompatible, have low evaporative resistance and thermal insulation, so as to provide better comfort to the users for long term on-skin monitoring.

SUMMARY OF INVENTION

The current invention will now be described by reference to the following numbered clauses.

1. An electrode material comprising:
    a non-woven silk-fibroin mesh substrate;
    glycerol; and
    a conductive polymeric material, wherein:
        40-65% of the silk-fibroin in the non-woven mesh substrate is in the form of β-sheets; and
        the electrode material is stretchable.

2. The electrode material according to Clause 1, wherein the conductive polymeric material may be selected from the group consisting of poly(3,4-ethylenedioxythiophene) polystyrene sulfonate (PEDOT:PSS), polythiophene (PTh), polyaniline (PANI), polypyrrole (PPy), polyacetylene (PA), poly(para-phenylene) (PPP), polyfuran (PF), optionally wherein the conductive polymer is PEDOT:PSS.

3. The electrode material according to Clause 1 or Clause 2, wherein the non-woven silk-fibroin mesh substrate may be a porous substrate having a top surface and a bottom surface and an interior portion formed by a plurality of silk-fibroin fibres attached to one another in a random fashion, where fibres in the top surface, the bottom surface and at least part of the interior portion are coated with glycerol and/or the conductive polymeric material.

4. The electrode material according to Clause 3, wherein the non-woven silk-fibroin mesh substrate may have a plurality of pores in the top surface, bottom surface and throughout the interior portion, such that the conductive polymeric material and/or glycerol is found in at least a portion of the plurality of pores (e.g. in pores on the top and bottom surface of the non-woven silk-fibroin mesh substrate and in pores in the interior portion of the non-woven silk-fibroin mesh substrate that are directly accessible through pores on the top and bottom surface of the non-woven silk-fibroin mesh substrate).

5. The electrode material according to any one of the preceding clauses, wherein the conductivity of the electrode material may be from 12 to 30 S/cm, such as from 15 to 27 S/cm, such as from 20 to 25 S/cm, such as about 24 S/cm.

6. The electrode material according to any one of the preceding clauses, wherein a strain may be applied to the electrode material to stretch it to from 100 to 400% above its original size along any dimension.

7. The electrode material according to Clause 6, wherein a strain may be applied to the electrode material to stretch it to from 150 to 350%, such as from 200 to 250%, above its original size along any dimension.

8. The electrode material according to Clause 6 or Clause 7, wherein the electrode material may maintain conductivity during and/or after stretching.

9. The electrode material according to Clause 8, wherein the electrode material may have a $\Delta R/R_0$ of from 2 to 10, such as from 3 to 5, such as about 4 when a strain is applied to the electrode material that stretches it to 100% above its original size along any dimension.

10. The electrode material according to Clause 8 or Clause 9, wherein the electrode material may maintain its conductivity during and after 100 strain cycles, where the strain applied to the electrode material stretches it to 30% above its original size along any dimension, optionally wherein the electrode material has a $\Delta R/R_0$ of from 0.1 to 0.3, such as from 0.15 to 0.25, such as from 0.15 to 0.2 when the strain applied to the electrode material stretches it to 30% above its original size along any dimension.

11. The electrode material according to any one of the preceding clauses, wherein the evaporative resistance of the electrode material may be from 11 to 30 $Pa \cdot m^2 \cdot W^{-1}$, such as from 15 to 25 $Pa \cdot m^2 \cdot W^{-1}$, such as about 23 $Pa \cdot m^2 \cdot W^{-1}$, when measured using ASTM F2370-10.

12. The electrode material according to any one of the preceding clauses, wherein the water vapour transmission rate (WVTR) may be:
   from 40 to 60 $g \cdot m^2 \cdot h^{-1}$, such as from 45 to 55 $g \cdot m^2 \cdot h^{-1}$, such as from 49 to 52 $g \cdot m^2 \cdot h^{-1}$ at 20° C., when measured using ASTM E96-95; and/or
   from 100 to 130 $g \cdot m^2 \cdot h^{-1}$, such as from 110 to 120 $g \cdot m^2 \cdot h^{-1}$, such as from 116 to 119 $g \cdot m^2 \cdot h^{-1}$ at 37° C., when measured using ASTM E96-95.

13. The electrode material according to any one of the preceding clauses, wherein the electrode material may have a Young's modulus of from 0.1 to 25 MPa, such as from 0.5 to 15 MPa, such as from 1 to 3 MPa, such as less than 3 MPa.

14. The electrode material according to any one of the preceding clauses, wherein the weight of a material loaded onto a dry non-woven silk-fibroin mesh substrate may be from 40 to 700% more than the weight of the dry non-woven silk-fibroin mesh substrate, where:
   the weight of the material loaded onto the dry non-woven silk-fibroin mesh substrate is measured after a period of 12 hours in an ambient atmosphere following completion of an annealing step conducted on the electrode material, said annealing step involving heating the electrode material to a temperature of from 100 to 150° C. for a period of from 5 to 30 minutes; and
   the material loaded onto the dry non-woven silk-fibroin mesh substrate comprises glycerol and a conductive polymeric material.

15. A method of forming an electrode material (e.g. as defined in any one of Clauses 1 to 14), wherein the method comprises the steps of:
   (a) immersing a glycerol-stabilised non-woven silk-fibroin mesh substrate in an aqueous solution comprising a conductive polymeric material, glycerol and 0-5 wt % of a surfactant for a period of time to provide a coated substrate;
   (b) annealing the coated substrate at a temperature of from 100 to 150° C. for a period of from 5 to 30 minutes to provide an annealed product; and
   (c) allowing the annealed product to equilibrate under ambient conditions for a period of at least 12 hours to provide the electrode material.

16. The method according to Clause 15, wherein the conductive polymeric material may be selected from the group consisting of poly(3,4-ethylenedioxythiophene) polystyrene sulfonate (PEDOT:PSS), polythiophene (PTh), polyaniline (PANI), polypyrrole (PPy), polyacetylene (PA), poly(para-phenylene) (PPP), polyfuran (PF), optionally wherein the conductive polymer is PEDOT:PSS.

17. The method according to Clause 15 or Clause 16, wherein:
   (ai) the surfactant may be Triton X-100; and/or
   (aii) the surfactant may be present at a concentration of about 1 wt %; and/or
   (aiii) the period of time in step (a) may be for a period of at least 5 minutes, such as from 5 minutes to 8 hours.

18. The method according to any one of Clauses 15 to 17, wherein:
   (bi) the glycerol may have present in an amount of from 2 to 40 vol %, such as from 5 to 30 vol %, such as from 10 to 20 vol %, such as 15 vol % of the aqueous solution comprising a conductive polymeric material, glycerol and 0-5 wt % of a surfactant; and/or
   (bii) the conductive polymeric material may be present in an amount of from 0.8 to 2.8 wt %, such as from 1.0 to 1.3 wt %, such as 1.1 wt % of the aqueous solution comprising a conductive polymeric material, glycerol and 0-5 wt % of a surfactant.

19. The method according to any one of Clauses 15 to 18, wherein the glycerol-stabilised non-woven silk-fibroin mesh substrate may be provided by the steps of:
   (A) immersing a non-woven silk fibroin mesh in glycerol for a period of from 0.5 to 2 hours at a temperature of from 40 to 80° C.;
   (B) washing the non-woven silk-fibroin mesh obtained from step (A) with water; and
   (C) drying the washed mesh of step (B) to obtain the glycerol-stabilised non-woven silk-fibroin mesh substrate.

20. The method according to Clause 19, wherein the non-woven silk-fibroin mesh may be obtained by electrospinning a solution of silk-fibroin in a mixture of formic acid and polyethylene oxide to provide the non-woven silk-fibroin mesh.

21. The method according to Clause 20, wherein:
   (Ai) the mixture of formic acid and polyethylene oxide may contain from 0.1 to 0.5 wt % polyethylene oxide, such as from 0.2 to 0.3 wt %, such as about 0.24 wt %; and/or
   (Aii) the polyethylene oxide may have a number average molecular weight of from 750,000 to 2,500,000 Daltons, such as 1,000,000 Daltons.

DESCRIPTION

Figure 1:
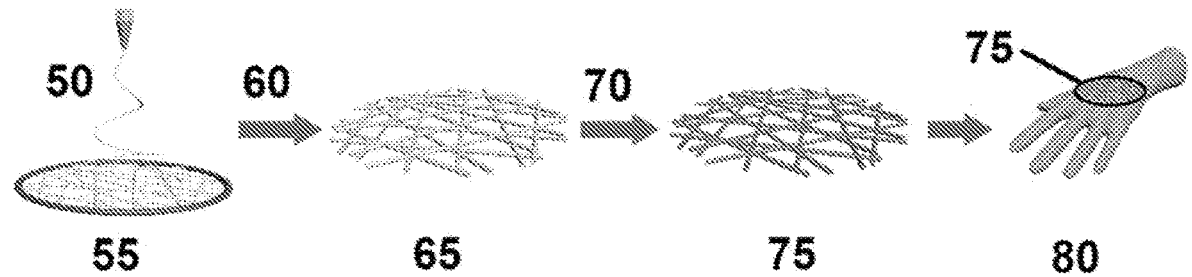
FIG. 1 Depicts a schematic illustration on the preparation of stretchable and gas-permeable silk-based electrodes 75 of the current invention.

It has been surprisingly found that an electrode material formed from using a non-woven silk-fibroin mesh substrate overcomes some or all of the problems discussed hereinbefore. Thus, in a first aspect of the invention, there is provided an electrode material comprising:
a non-woven silk-fibroin mesh substrate;
glycerol; and
a conductive polymeric material, wherein:
40-65% of the silk-fibroin in the non-woven mesh substrate is in the form of $\beta$-sheets; and
the electrode material is stretchable.

More specifically, the materials disclosed herein may be stretchable, highly conductive, and at the same time have high gas permeability, making them suitable for use in on-skin devices under dry/wet conditions. Additionally, the materials disclosed herein are also biocompatible, have low evaporative resistance and thermal insulation, so as to provide better comfort to users for long term on-skin monitoring.

The word "comprising" refers herein may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

Non-woven meshes are sheet- or web-like structures bonded together by entangling fibres or filaments mechanically, thermally or chemically. They are not made by weaving or knitting and do not require that the fibres be converted to a yarn. The non-woven silk-fibroin mesh substrate used herein may be initially formed by any suitable method known. For example, in embodiments of the invention that may be mentioned herein the non-woven silk-fibroin mesh substrate may be formed by electrospinning.

As will be appreciated based on the above, the non-woven silk-fibroin mesh substrate is formed from a plurality of silk-fibroin fibres attached to one another in a random fashion. These fibres form a top surface, a bottom surface and an interior portion (i.e. between the top and bottom surfaces of the mesh substrate). As the silk-fibroin substrate is a mesh, it will also be porous. In certain embodiments that may be mentioned herein, where fibres in the top surface, the bottom surface and at least part of the interior portion are coated with glycerol and/or the conductive polymeric material in the porous, non-woven silk-fibroin mesh substrate. As the non-woven silk-fibroin mesh substrate contains pores throughout its structure (i.e. it has a plurality of pores in the top surface, bottom surface and throughout the interior portion), the conductive polymeric material and/or glycerol may be found in at least a portion of the plurality of pores. For example, the conductive polymeric material and/or glycerol may be found in pores on the top and bottom surface of the non-woven silk-fibroin mesh substrate and in pores in the interior portion of the non-woven silk-fibroin mesh substrate that are directly accessible through pores on the top and bottom surface of the non-woven silk-fibroin mesh substrate. As will be appreciated, if the silk-fibroin mesh substrate is particularly thick, there may be pores within the interior portion that are not accessible through pores found on the surface layers of the mesh.

When used herein, "silk-fibroin" refers to any suitable fibroin protein obtained from any suitable natural source, such as the larvae of *Bombyx mori*, other moth genera such as *Antheraea, Cricula, Samia* and *Gonometa*, spiders (i.e. spider silk) and numerous other insects. In embodiments of the invention that may be mentioned herein, the silk-fibroin may be obtained from *Bombyx mori*.

As noted above, the silk-fibroin used herein has a substantial portion in the form of β-sheets, which is believed to provide the material with beneficial properties, as discussed in more detail hereinbelow. Details of how to quantitatively establish the amount of the silk-fibroin in the form of β-sheets is provided in the experimental section below.

Any conductive polymeric material suitable for use in the intended applications of the material (as described herienbelow) may be used in the electrode material. Examples of suitable materials include, but are not limited to, poly(3,4-ethylenedioxythiophene) polystyrene sulfonate (PEDOT:PSS), polythiophene (PTh), polyaniline (PANI), polypyrrole (PPy), polyacetylene (PA), poly(para-phenylene) (PPP), polyfuran (PF), and combinations thereof. In embodiments of the invention that may be mentioned herein, the conductive polymer may be PEDOT:PSS.

As will be appreciated, the electrode material described herein has the ability to conduct electricity. Any suitable conductivity may be achieved by the electrode for any desired application. For example, the conductivity of the electrode material described herein may be from 12 to 30 S/cm, such as from 15 to 27 S/cm, such as from 20 to 25 S/cm, such as about 24 S/cm.

The electrode material described herein may be stretchable. This stretchability may make the electrodes more suitable for use in garments or to attach to the skin of a subject (e.g. a human)—especially one who will undertake strenuous activities. For example, when a strain is applied to the electrode material to stretch it, the electrode material may stretch to from 100 to 400% above its original size along any dimension. It is noted that the silk-fibroin mesh substrate may be formed by the random laying of the silk-fibroin fibres, which allows this stretchability in any direction. If the silk-fibroin fibres are aligned, then the substrate may only show a reasonable degree of stretch along one direction of strain, while in the others, its stretch performance may be poor (i.e. less than 100% stretch above its original size).

In particular embodiments that may be mentioned herein, when a strain is applied to the electrode material, it may stretch to from 150 to 350%, such as from 200 to 250%, above its original size along any dimension.

For the avoidance of doubt, it is explicitly contemplated that where a number of numerical ranges related to the same feature are cited herein, that the end points for each range are intended to be combined in any order to provide further contemplated (and implicitly disclosed) ranges. Thus, in relation to the above related (stretch) numerical ranges, there is disclosed:

100 to 150%, 100 to 200%, 100 to 250%, 100 to 350%, 100 to 400%;
150 to 200%, 150 to 250%, 150 to 350%, 150 to 400%;
200 to 250%, 200 to 350%, 200 to 400%;
250 to 350%, 250 to 400%; and
350 to 400%.

A surprising advantage associated with the electrode material disclosed herein is that the electrode material maintains conductivity during and/or after stretching. This may be after a single strain cycle (a single application of a stretch and then relaxation), or multiple strain cycles (the electrode material is subjected to multiple strain and relaxation steps). For example, the electrode material may maintain its conductivity during and after 100 strain cycles, where the strain applied to the electrode material stretches it to 30% above its original size along any dimension. When used herein, the term "maintains conductivity" may mean that:

(AA) the same level of conductivity is preserved before, during and after the material is subjected to a strain (i.e. the resistance of the material is constant before, during and after stretching by the application of a strain); or (AB) the material maintains a functional level of conductivity during and after stretching (as well as before stretching). In other words, the material may display some variation in its resistance levels before, during and after a strain is applied, but these do not result in the material losing its ability to be conductive.

In embodiments of the invention that may be mentioned herein, the material may display a small resistance change when a strain is applied. For example, the electrode material may have a resistance change ($\Delta R/R_0$) of from 2 to 10, such as from 3 to 5, such as about 4 when a strain is applied to the electrode material that stretches it to 100% above its original size along any dimension. Alternatively or additionally, the electrode material may have a resistance change ($\Delta R/R_0$) of from 0.1 to 0.3, such as from 0.15 to 0.25, such as from 0.15 to 0.2 when the strain applied to the electrode material stretches it to 30% above its original size along any dimension. In this latter embodiment, this resistance change ($\Delta R/R_0$) may be after a single strain cycle or through 100 strain cycles.

Electrodes that bridge the skin and machine are crucial for signal acquisition of wearable electronic devices. However, the development of skin-friendly electrodes is still challenging due to the high sensitivity of skin and gas-impermeability of electrode materials. The electrode material disclosed herein is a highly conformal, highly breathable, metal-free, and stretchable electrode that can be directly attached to the skin of a subject (e.g. a human), which is extremely suitable for sweaty exercise use. Even when a subject has been exercising hard and is sweating profusely, the electrode materials disclosed herein show better electrocardiography (ECG) signals quality than commercial gel electrodes. In addition, the electrode materials disclosed herein do not disturb the heat dissipation during sweat evaporation. Without wishing to be bound by theory, it is believed that these effects are achieved in part through the use of the porous silk-fibroin mesh substrate (having a substantial proportion of β-sheets in its make-up) and by the use of a conductive polymeric material.

As will be anticipated, the electrode materials disclosed herein have superior evaporative resistance values compared to conventional electrode materials. For example, the evaporative resistance of the electrode materials disclosed herein may be from 11 to 30 $Pa \cdot m^2 \cdot W^{-1}$, such as from 15 to 25 $Pa \cdot m^2 \cdot W^{-1}$, such as about 23 $Pa \cdot m^2 \cdot W^{-1}$, when measured using ASTM F2370-10. It is noted that the evaporative resistance values obtained by the electrode materials disclosed herein are comparable to that of naked manikin skin (~11 $Pa \cdot m^2 \cdot W^{-1}$), when measured using the same ASTM protocol.

The water vapour transmission rate (WVTR) of the electrode materials disclosed herein may be:

from 40 to 60 $g \cdot m^2 \cdot h^{-1}$, such as from 45 to 55 $g \cdot m^2 \cdot h^{-1}$, such as from 49 to 52 $g \cdot m^2 \cdot h^{-1}$ at 20° C., when measured using ASTM E96-95; and/or from 100 to 130 $g \cdot m^2 \cdot h^{-1}$, such as from 110 to 120 $g \cdot m^2 \cdot h^{-1}$, such as from 116 to 119 $g \cdot m^2 \cdot h^{-1}$ at 37° C., when measured using ASTM E96-95.

The water vapour transmission rates (WVTRs) were measured at 20° C. and 37° C. to mimic the comfortable and heavy sweating conditions of the human body, respectively. The electrode materials disclosed herein have WVTRs that are larger than the transepidermal water loss (TEWL) of the skin of adults under normal (TEWL$_{skin}$=~5-10 g·m$^{-2}$·h$^{-1}$) and exercise conditions (TEWL$_{skin}$=~6-66 g·m$^{-2}$·h$^{-1}$). This indicates that water-vapour loss and sweat evaporation by skin will not be blocked by the electrode materials disclosed herein under normal or even sweaty states, which means that a subject's skin can breathe well, with a normal metabolism, when electrode materials disclosed herein are applied to said skin.

Thus, the breathable and stretchable electrode materials disclosed herein, which also display skin conformability (see Example 4 and FIGS. 14a-c) are suited for the recording of on-skin electrophysiological signals. This is because the material has little impact on the skin's normal physiological conditions—especially as the electrode materials disclosed herein can be compressed and deformed without significant impact on its performance, which enables it to be used during normal day-to-day activities, including exercise. Furthermore, the electrode materials disclosed herein exhibit low interfacial impedance with skin, which is comparable to commercial gel electrodes and lower than Au mesh-based electrodes (see Example 4, FIGS. 14d and 15a). This low interfacial impedance and high skin conformability are crucial for the signal integrity and sensitivity in electrophysiological measurement. As such, the electrode materials disclosed herein are useful in the recording of electrocardiography (ECG) signals in both the calm/resting state and in the after-exercise state of a subject. As is demonstrated in the experimental section below, the signal quality obtained for the electrode materials disclosed herein under sweaty conditions displays a better signal-to-noise ratio than commercial gel electrodes after exercise. Without wishing to be bound by theory, it is believed that this is because the commercial electrodes are unbreathable and a sweat film is formed between the skin and the ionic hydrogel. This sweat film disables the adhesive of the commercial electrode and thus decreases its conformity with the subject's body, reducing the signal fidelity. In contrast, as the electrode materials disclosed herein are breathable, the sweat is able to permeate and evaporate easily. Additionally, it is noted that the interfacial impedance decreases in the currently disclosed electrode materials upon wetting (see Example 4, FIG. 15b) meaning that the signals were minimally impacted by sweat during exercise.

An additional advantage associated with the breathability of the electrode materials disclosed herein is that the breathability helps to prevent electrodes made from the electrode materials from acting as a thermal insulator during exercise, and thereby reduces sweat accumulation too. The thermal insulation of electrodes is the key factor that causes discomfort when a subject wears electrodes on the skin during exercise. Again, it is believed that the thinness and porous structure of the electrode materials disclosed herein results in good thermal transmission when attached on the skin. Optical and infrared photographs of a skin area wearing three different electrodes before and after exercise (see FIG. 14f) show that there is no temperature variation between skin wearing an electrode formed from the electrode material disclosed herein and adjacent naked skin. However, the temperature is shown to increase for skin covered by conventional electrodes. Thus, it is believed that the electrode materials disclosed herein possess superior physiological comfort when compared with commonly used commercial electrodes and polymer electrodes, which is important for long-term monitoring during sports and other activities that produce a significant amount of sweat.

As noted herein, the electrode material disclosed herein are flexible, stretchable, and hence, are conformable with human skin—even during exercise, where the skin may undergo compression or expansion. Thus, the electrode material disclosed herein displays a suitable range of flexibility and conformability. This may be measured by the Young's modulus of the electrode material. Suitable values of Young's modulus for the electrode materials disclosed herein may include from 0.1 to 25 MPa, such as from 0.5 to 15 MPa, such as from 1 to 3 MPa, such as less than 3 MPa.

As will be appreciated, the electrode material disclosed herein is formed in part by the silk-fibroin mesh substrate, in part by glycerol and in part by the conductive polymeric material. In addition to these materials, part of the overall composition of the resulting electrode material may simply be water captured from the ambient environment. Thus, the weight of a material loaded onto a dry non-woven silk-fibroin mesh substrate may be from 40 to 700% more than the weight of the dry non-woven silk-fibroin mesh substrate, where:

the weight of the material loaded onto the dry non-woven silk-fibroin mesh substrate is measured after a period of 12 hours in an ambient atmosphere following completion of an annealing step conducted on the electrode material, said annealing step involving heating the electrode material to a temperature of from 100 to 150° C. for a period of from 5 to 30 minutes; and the material loaded onto the dry non-woven silk-fibroin mesh substrate comprises glycerol and a conductive polymeric material. As noted above, while the weight of the material loaded onto the dry non-woven silk-fibroin mesh substrate will include glycerol and the conductive polymeric material, it may also contain moisture (water) trapped from the ambient environment.

Also disclosed herein is a method of forming an electrode material, wherein the method comprises the steps of:

(a) immersing a glycerol-stabilised non-woven silk-fibroin mesh substrate in an aqueous solution comprising a conductive polymeric material, glycerol and 0-5 wt % of a surfactant for a period of time to provide a coated substrate;

(b) annealing the coated substrate at a temperature of from 100 to 150° C. for a period of from 5 to 30 minutes to provide an annealed product; and (c) allowing the annealed product to equilibrate under ambient conditions for a period of at least 12 hours to provide the electrode material.

The method above may be used to form the electrode materials described hereinbefore.

As will be appreciated, the conductive polymeric material used in the manufacture of the electrode material will be selected from those disclosed hereinbefore.

When present, any suitable surfactant may be used in the process described hereinbefore. For example, the surfactant may be a non-ionic surfactant, such as Triton X-100. When present, the surfactant may be present in any suitable concentration in the aqueous solution comprising a conductive polymeric material, glycerol and surfactant. For example, the surfactant may be present in an amount of from 0.1 to 5 wt %, such as at a concentration of about 1 wt %.

The immersing step used herein may be conducted for any suitable amount of time, which may be readily established by a skilled person in this field of manufacture. For example, the period of time in step (a) of the method may be for a period of at least 5 minutes, such as from 5 minutes to 8 hours.

Any suitable amount of glycerol may be used in the method disclosed above. For example, the glycerol may be present in an amount of from 2 to 40 vol %, such as from 5 to 30 vol %, such as from 10 to 20 vol %, such as 15 vol % of the aqueous solution comprising a conductive polymeric material, glycerol and 0-5 wt % of a surfactant.

Any suitable amount of the conductive polymeric material may be used in the method disclosed above. For example, the conductive polymeric material may be present in an amount of from 0.8 to 2.8 wt %, such as from 1.0 to 1.3 wt %, such as 1.1 wt % of the aqueous solution comprising a conductive polymeric material, glycerol and 0-5 wt % of a surfactant.

The glycerol-stabilised non-woven silk-fibroin mesh substrate used in the method above may be provided by the steps of:
(A) immersing a non-woven silk fibroin mesh in glycerol for a period of from 0.5 to 2 hours at a temperature of from 40 to 80° C.;
(B) washing the non-woven silk-fibroin mesh obtained from step (A) with water; and
(C) drying the washed mesh of step (B) to obtain the glycerol-stabilised non-woven silk-fibroin mesh substrate.

The non-woven silk-fibroin mesh used to form the glycerol-stabilised non-woven silk-fibroin mesh substrate may be obtained by electrospinning a solution of silk-fibroin in a mixture of formic acid and polyethylene oxide to provide the non-woven silk-fibroin mesh. The mixture of formic acid and polyethylene oxide may contain from 0.1 to 0.5 wt % polyethylene oxide, such as from 0.2 to 0.3 wt %, such as about 0.24 wt %. The polyethylene oxide may have a number average molecular weight of from 750,000 to 2,500,000 Daltons, such as 1,000,000 Daltons.

Further aspects and embodiments of the current invention will now be described by the following non-limiting examples.

EXAMPLES

Methods
Molecular Dynamics Simulations of Amorphous Domain

The simulation was performed as we previously reported by the software package GROMACS 4.5.5 (G. Chen, et al. *Adv. Mater.* 2018, 30, 1800129; D. Van Der Spoel, et al. *J. Comput. Chem.* 2005, 26, 1701).

Briefly, the initial structures for amorphous domain were built based on the silk fibroin sequence according to the Linker 6 as published by Zhou et al.: GAGAGAGAGAGTGSSGFGPYVANGGYSGY-EYAWSSESDFGTGS (C. Z. Zhou, et al. *Proteins* 2001, 44, 119). They consisted of 12 fully extended silk fibroin molecules. These amorphous chains were arranged in an antiparallel manner with an initial distance of 5 Å between adjacent chains, followed by 500 ns of stochastic dynamics simulation in implicit solvent to stimulate the structures. Then, energy minimization was carried out on the structure to obtain the pre-equilibrated amorphous domain. The following molecular dynamics simulations were carried out based on this pre-equilibrated amorphous domain both in vacuum and in water. The initial structure of the glycerol molecule was generated by Materials Studio, BIOVIA. 10 glycerol molecules were added randomly into the amorphous domain.

For the simulation in water, the system was solvated in explicit water box with a dimension of 6.56×5.67×17.02 $nm^3$. A model of transferable intermolecular potential with 3 points (TIP3P) was accepted for the water (W. L. Jorgensen, et al. *J. Chem. Phys.* 1983, 79, 926). 36 $Na^+$ ions were added to neutralise the system. Then another energy minimization process was carried out for both conditions. At the end, molecular dynamics simulation was conducted to the previous pre-equilibrated systems under 100 ns of Canonical ensemble (NVT) at a temperature of 300 K and 500 ns Isothermal-isobaric (NPT) ensemble at a temperature of 300 K and pressure of 1 bar both in vacuum and in water (H. J. C. Berendsen, et al. *J. Chem. Phys.* 1984, 81, 3684). Secondary structures of protein were analyzed using the STRIDE algorithm, which is a built-in module in the VMD Molecular Graphics Viewer (M. Heinig, D. Frishman, *Nucleic Acids Res.* 2004, 32, W500). All the representative snapshots for protein configuration were produced using VMD Molecular Graphics Viewer (W. Humphrey, et al. *J. Mol. Graph.* 1996, 14, 33).

Measurement of Water Vapour Transmission Rates (WVTR)

The water vapour transmission rates of electrodes at 20° C. and 37° C. were evaluated based on standard ASTM E96-95. The tests were performed by periodically measuring the weight loss of water in a bottle where the opening was covered by the samples. The WVTR is calculated by the following equation:

$$WVTR = \frac{G/t}{A} \quad (1)$$

where G is the weight change, t is the time during the weight change, A is the test area for the sample.

Measurement of Thermal Insulation and Evaporative Resistance of Electrodes

Figure 11:
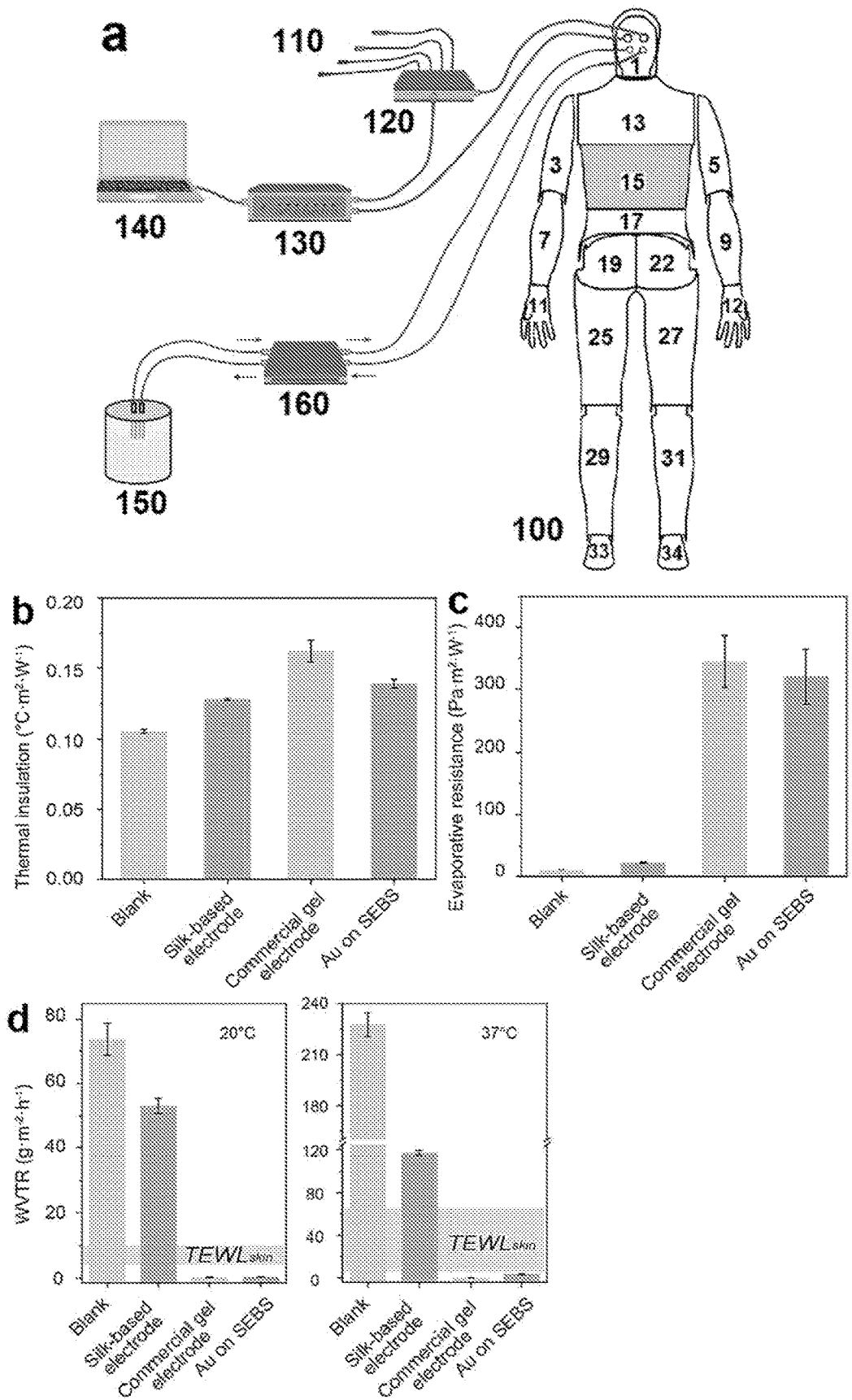
FIG. 11 Depicts thermal insulation, evaporative resistance, and water vapour permeability characteristics of the silk-based electrode of the current invention: (a) schematic illustration of the 34-segment thermal "Newton" manikin system 100, the marked area (zone 15) is the used test segment; (b) thermal insulation, and (c) evaporative resistance of silk-based electrode (Silk-P-15G) compared with commercial gel electrodes and Au electrode on SEBS polymer substrates; and (d) water vapour transmission rates (WVTRs) of silk-based electrode (Silk-P-15G) under simulated comfortable (20° C.) and sweaty (37° C.) conditions, compared with commercial hydrogel electrodes and Au electrode on SEBS. Marked areas are the ranges of transepidermal water loss (TEWL) for skin of adults in normal state and during exercise.
Figure 12:
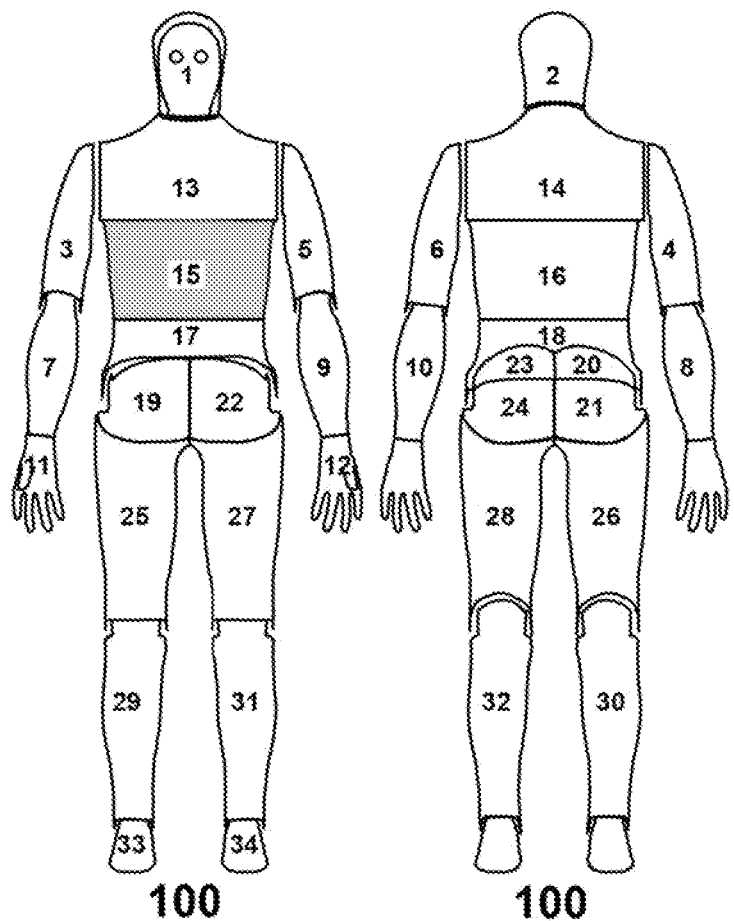
FIG. 12 Depicts a photo of thermal manikin 100 and the detail zone divisions (the marked zone 15 is the used test segment). The center figure depicts the front view, while the right figure shows the back view of the manikin 100.
Figure 12:
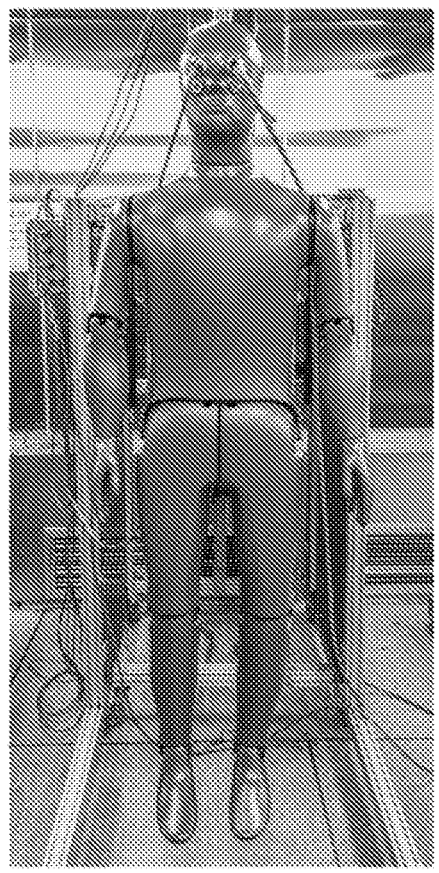

A 34-zone "Newton" thermal manikin 100 (Measurement Technology Northwest, Seattle, Wash., USA) equipped with sweating function was used (as shown in FIGS. 11a and 12). Each zone (numbers on manikin 100) contains a heating element and temperature sensors within the "skin" of the manikin, and the individual surface temperature or heating power could be controlled at a normal human body state. The temperature is monitored using ambient sensors 110 attached to a sensor box 120, which is controlled by a power enclosure 130 and a computer 140. Further, a water circulation system (comprising a water reservoir 150 and pump enclosure 160) is connected to the manikin. Small pores over the surface of the manikin 100 are spaced to uniformly and controllably deliver water to the skin surface after wearing a removable wicking fabric skin, which can mimic the sweating of real human body. The temperature, sweat rate, and heat flux generated during experiment at each body part were monitored by ThermDAC™ software.

The measurement of thermal insulation followed the ISO 15831 2004 standard with some modifications. The manikin was placed in a climatic chamber (ESPEC Inc., Osaka, Japan) where the constant air temperature, air speed, and relative humidity were set at 20° C., 0.4 m/s, and 50%, respectively. The constant temperature mode was used, and the manikin surface temperature was controlled at 34° C. during experiments. All thin-film electrode samples were cut into rectangle and reconnected together to totally cover the zone 15 of manikin without gaps between the edge of samples, and air gaps between samples and the skin of manikin. After starting the test, the system was equilibrated for at least 30 min to reach steady-state conditions, and data were recorded at 30 s intervals. The thermal insulation was calculated by the following equation:

$$R_t = \frac{(T_m - T_a)A}{H_i} \quad (2)$$

where $R_t$ is the local thermal insulation at the used segment of manikin (°C·m$^2$·W$^{-1}$); $T_m$ and $T_a$ are the manikin surface temperature of the corresponding segment and the air temperature (°C.), respectively; A is the sweating fabric skin surface area of the corresponding segment (m$^2$); and $H_i$ is the measured dry heat loss at the corresponding segment (N).

The evaporative resistance was measured based on the procedures in standard ASTM F2370-10. The tests were performed in an isothermal condition where the air temperature and relative humidity were controlled at 34° C. and 60% respectively. Typically, the water flow rate was set as 400 ml·m$^2$/h and a pre-wetted polyester fabric "skin" was used before attaching samples to simulate sweating of human skin. The other procedures were similar to those of the thermal insulation measurement as mentioned before. The evaporative resistance was calculated by the following equation:

$$R_e = \frac{(P_s - P_a)A}{H_e} \quad (3)$$

where $R_e$ is the evaporative resistance at the used segment of manikin (Pa·m$^2$·W$^{-1}$); $P_s$ is the corresponding segmental water vapour pressure on the wet fabric skin (Pa); $P_a$ is the water vapour pressure in the air (Pa); A is the sweating fabric skin surface area of the corresponding segment (m$^2$); $H_e$ is the local segmental evaporative heat loss (W).

Measurements of Mechanical and Electrical Properties

Stress-strain curves were obtained by a mechanical tester (C42, MTS Systems Corporation) at a speed of 1 mm·min$^{-1}$ in ambient humidity. Typically, the relative humidity is at the range of 60-70% in the lab. Mechanical tests under water were tested in Bionix chamber of MTS C42.

The conductivity of silk-based electrodes was measured by Keithley 2450 source-meter using a four-point probes method. Four electrical probes with an equal spacing of 5 mm between probes were used to avoid the changes of contact resistance on samples. The resistance change under cyclic strains were measured by a semiconductor parameter analyzer (Keithley 4200-SCS, Tektronix) while strains were applied by a mechanical tester at a speed of 1 mm·min$^{-1}$. The effective stretch area of samples was kept at 1 cm (length)×0.5 cm (width).

Skin Interfacial Impedance Measurement

The interfacial impedance was measured by laminating pairs of electrodes with a circle shape (diameter: 2 cm) on forearm skin, and the center-to-center distance was kept at 5 cm. As comparison, silk-based electrodes, gold (Au) mesh (depositing Au on as spun silk and then dissolving silk on skin), and commercial gel electrodes (Large muscle electrodes, Backyard Brains) were used. The interfacial impedance measurements were conducted using electrochemical workstation (ZAHNER ZENNIUM).

Infrared Spectroscopy (FTIR) Measurements

The FTIR spectra of all samples were collected using the FTIR spectrometer in attenuated total reflection (ATR) mode (The PerkinElmer Frontier™ IR) from the wavenumber of 4000 cm$^{-1}$ to 1000 cm$^{-1}$. For each measurement, 32 scans with a nominal resolution of 4 cm$^{-1}$ were co-added to yield the spectra.

Scanning Electron Microscope (SEM) Observation and Fast Fourier Transform (FFT) Analysis The SEM images were obtained by Field Emission Scanning Electron Microscopy (JEOL JSM-7600F) at an acceleration voltage of 5 kV under secondary electron image (SEI) mode. Before observation, the samples were stretched to a certain strain and glued to a silicon wafer. A 2D FFT image analysis was applied to quantify the fiber alignment (C. Ayres, et al. *Biomaterials* 2006, 27, 5524). SEM images were squarely cropped and converted to 8-bit grayscale at first. Then FFT computation was adopted to the images by the open-source ImageJ software. The FFT images were then analyzed with an "Oval Profile Plot" plugin, in which the radial pixel intensity was summed at the acquisition angle from 0° to 180° (B. O'Connell, Oval Profile Plot, https://imagej.nih.gov/ij/plugins/oval-profile.html 2019). All the data was normalised to a baseline value of 0 for easy comparison.

ECG Signals Measurement

For performance evaluation of the silk-based electrode and comparison with commercial gel electrode, ECG signals were measured both in normal state before exercise and sweaty state after exercise. The ECG signals were acquired by a commercial portable ECG monitor (model PC-80B, Heal Force Bio-Meditech, Shanghai, China), and a three-lead system was used. Two electrodes were fixed on the left and right sides of the ribcage, and the reference ground was located at the lower right abdomen. The experiments were performed on outdoor playground (Sports & Recreation Centre, Nanyang Technological University). The resting-state ECG signals were measured first, and after running 1000 m within 3-4 min while wearing the electrodes, the ECG signals were measured again. To visualise the influence of various electrodes on the temperature variation of skin after exercise, three types of electrodes (silk-based electrode, commercial gel electrode, and Au on SEBS polymer electrode) were pasted side by side on the middle of the ribcage. A thermal infrared camera (Ti450, Fluke Corp., USA) was used to record the skin temperature before and after running. For this experiment, it should be noted that excessive exercise was avoided, to prevent the skin temperature from rising too drastically, which cannot be effectively lowered by sweat evaporation. If that happens, it will be difficult to distinguish the performances among the three electrodes.

All experiments on human skin were approved by Institute of Review Board at Nanyang Technological University (approval number: IRB-2017-08-035).

General Procedure 1—Preparation of Regenerated Silk Fibroin

*Bombyx mori* silk fibers were boiled in aqueous solution of 0.5 wt % Na$_2$CO$_3$ for 60 min and then rinsed thoroughly with distilled water to remove the glue-like sericin. The degummed silk fibers were dried in air and then directly dissolved in formic acid which contains 6 wt % CaCl$_2$ yielding 3 wt % silk solution. After magnetically stirring for 4 h, the silk solution was cast in petri dish and dried in fume hood overnight to evaporate formic acid. After that, the resulting silk fibroin films were immersed in water for 24 h to remove the CaCl$_2$) and residual formic acid, and finally the regenerated silk fibroin films were dried in oven for later use.

General Procedure 2—Electrospinning of Silk Fibroin

Regenerated silk fibroin films (from "General Procedure 1") were dissolved in 98% formic acid to prepare 12 wt % spinning solution. A small amount of polyethylene oxide (PEO, 1,000,000 g/mol) (~0.24 wt %) was added to promote fiber formation. The electrospinning procedure of silk spinning solution was performed with an applied voltage of 15 kV and solution flow rate of 0.8 mL/h. The distance between the needle tip and metallic frame collector was kept at 20 cm. To prepare silk mats with aligned fibers, two parallel strip electrodes separated by a gap of 3 cm was used as a collector (D. Li, et al. *Nano Lett.* 2003, 3, 1167). The thickness of the prepared silk fiber mats was highly tunable by varying the spinning time. For the characterization of mechanical and electric properties, the thickness of the mats was controlled at ~20 µm for easy handling. For the evaluation of permeability and practical on-skin applications, the thickness was controlled at ~8-10 µm.

General Procedure 3—Preparation of Gold-Deposited Silk Electrode and PEDOT:PSS-Coated Polymer Electrodes The Silk-Au control electrode was obtained by depositing 120 nm Au thin films on as-spun silk fibroin mesh (from "General Procedure 2") via a vacuum thermal evaporator (Nano 36, Kurt J. Lesker) under $2 \times 10^{-6}$ Torr at a deposition rate of 0.3 Å·s$^{-1}$. The Au sources were purchased from Kurt J. Lesker and the purity was 99.99%.

The PEDOT:PSS-coated polymer electrodes were prepared by spin coating PEDOT:PSS (with 15 vol % glycerol and 1 wt % Triton X-100, see Example 1 below) aqueous solution on polydimethylsiloxane (PDMS, SYLGARD™ 184, USA) and styrene-ethylene-butylene-styrene (SEBS, Tuftec™ H1221, Japan) substrates—denoted as "PDMS-P-15G" and "SEBS-P-15G", respectively.

Example 1. Preparation of Silk-Based Electrodes of the Current Invention, and Effects of Glycerol on the Properties of the Electrodes The silk-based electrodes of the current invention were prepared, with the effects of glycerol on the properties of the electrodes investigated.

Experimental

The electrospun silk fiber mats (from "General Procedure 2") were stabilised by immersing in glycerol for 1 h at 60° C., followed by immersing in water overnight to remove glycerol and PEO (D. N. Rockwood, et al. Nat. Protoc. 2011, 6, 1612; H. J. Jin, et al. *Biomacromolecules* 2004, 5, 711). The washing is to minimize the formation of thick glycerol layer which may prevent the subsequent infiltration of the coating solution into the porous mesh structure (in µm scale). Thereafter, the silk mats were dried in air at ambient temperature. The control silk fiber mats immersed in methanol and ethanol, respectively, for 1 h were prepared for subsequent mechanical testing. The coating solution was prepared by simply mixing poly(3,4-ethylenedioxythiophene):polystyrene sulfonate (PEDOT:PSS) aqueous solution (Clevios PH 1000) with various amounts of glycerol and 1 wt % Triton X-100.

To prepare the silk-based electrode, the glycerol-stabilised silk mats were first immersed in the above coating solution for 15 min. After taking out and slightly removing the excess solution, they were dried in fume hood for 2-6 h according to the glycerol content. Finally, the dried fiber mats were thermally annealed at 120° C. for 15 min, and then kept at ambient conditions for 24 h to equilibrate with the ambient moisture level. The glycerol content in PEDOT:PSS coating solution was varied from 0, 2, 5, 10, 15, 20 to 40 vol %, and the final electrodes were labelled accordingly as Silk-P-0G, Silk-P-2G, Silk-P-5G, Silk-P-10G, Silk-P-15G, Silk-P-20G, and Silk-P-40G, respectively.

Results and Discussion

In a typical experiment, the thermal-wet comfortable and conformal silk-based electrodes were prepared by electrospinning of silk and subsequent dip-coating of PEDOT:PSS which contained glycerol as additive, as shown in FIG. 1. A silk fiber mat 55 was first obtained by electrospinning of silk with small amount of polyethylene oxide (PEO) (step 50, see "General Procedure 2", and *Nat. Protoc.* 2011, 6, 1612). This was followed by treatment with glycerol (in step 60) to stabilise the fragile fiber mats, and subsequent immersion in water overnight to form glycerol-stabilised silk fibers mats 65. The glycerol treatment step has enabled the original silk fiber mat with solution processability, and to be insoluble in water. Thereafter, the glycerol-stabilised fiber mat 65 was dip-coated with PEDOT:PSS aqueous solution doped with glycerol (step 70) to form the glycerol-plasticised silk-based polymeric electrodes 75 of the current invention. The as-prepared electrodes 75 are stretchable, breathable, and thermal-wet comfortable, and can be highly conformal on skin under sweaty conditions. Therefore, such electrodes 75 are highly suited for on-skin applications 80.

Here, glycerol plays the roles of plasticising the silk fiber mats as well as enhancing the conductivity of PEDOT:PSS. Silk fibroin is a mixture of β-sheet nanocrystals (crystalline region) and non-crystalline regions (amorphous domain) which determine the stability and mechanical properties of silk. After glycerol stabilisation, the characteristic amide I absorption band in Fourier Transform Infrared Spectroscopy (FTIR) spectra shifts from ~1648 cm$^{-1}$ to ~1625 cm$^{-1}$ (FIG. 2a and inset), indicating that the random coils dominated silk conformation has converted to the stable β-sheet structures. This stabilisation process renders the silk fiber mats with structural stability, which can tolerate lateral dip-coating process of PEDOT:PSS (with glycerol) and thermal anneal treatment (FIG. 3). As shown in FIG. 3, the physical fibrous structures of the fiber mats remained almost unchanged after glycerol stabilisation, and appeared to be only a little denser when coated with polymers PEDOT:PSS and glycerol.

Furthermore, the glycerol added in the coating solution has significantly modified the mechanical properties of silk-based electrodes. Glycerol could be hydrogen bonded to the peptide matrix and lead to less-organized silk II structures than methanol-treated silk materials. The amorphous domain plays a key role in the extensibility of silk. Molecular dynamics simulation on the amorphous domain shows that glycerol can bind with silk peptide, which plays a role of tuning the structural and mechanical properties of silk. The details of the model and simulation process of this molecular dynamics simulation are illustrated in the "Methods" Section.

Figure 4:
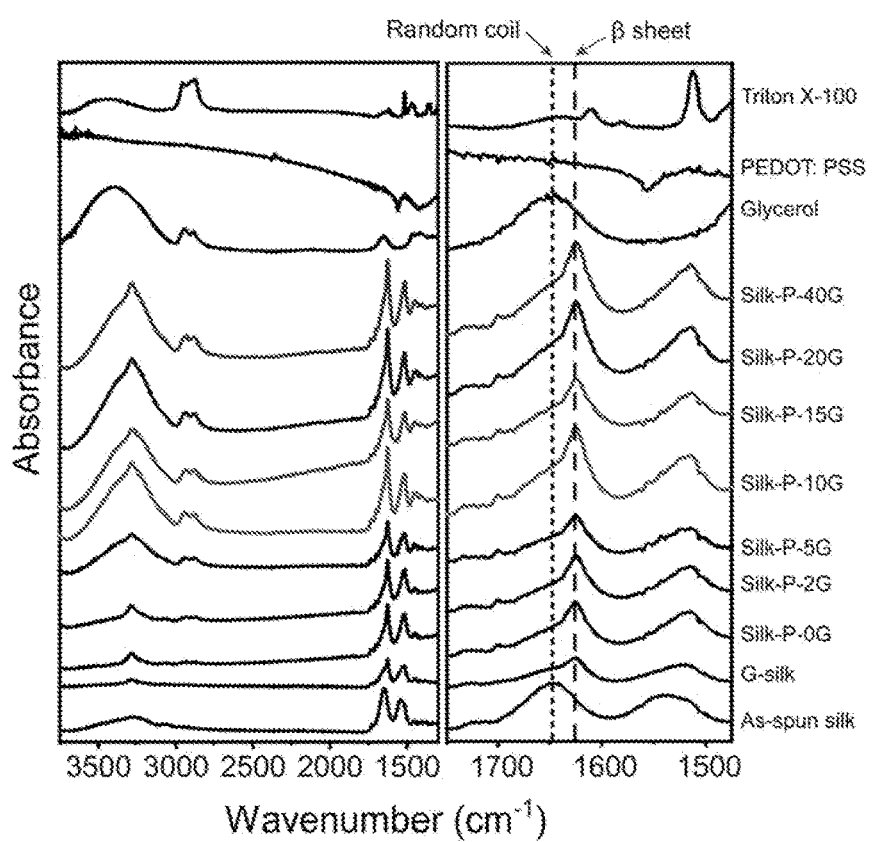
FIG. 4 Depicts FTIR spectra of silk-based electrodes with different glycerol contents, and the spectra of Triton X-100, PEDOT:PSS, and glycerol.
Figure 5:
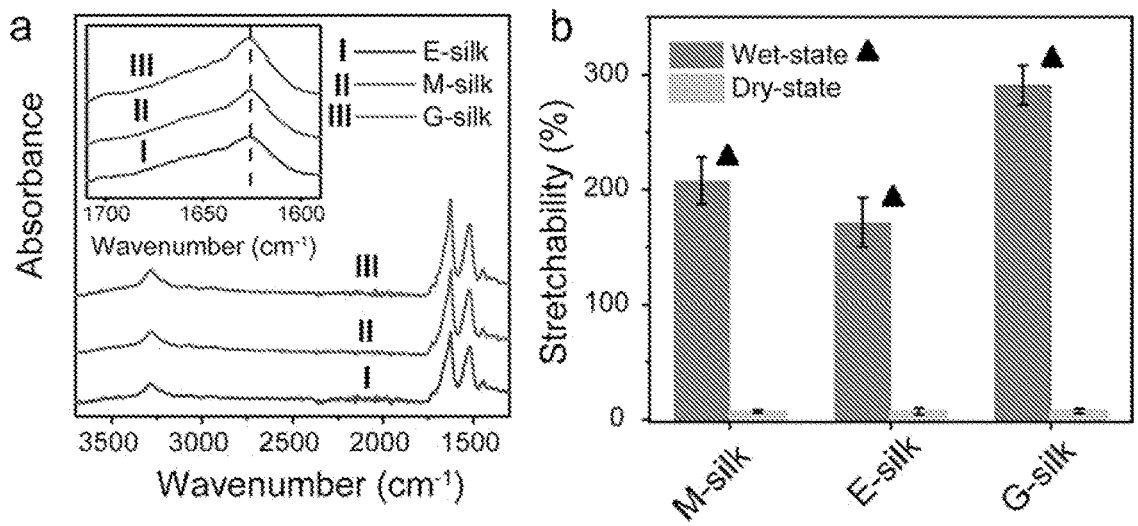
FIG. 5 Depicts: (a) FTIR spectra of ethanol-treated silk (E-silk), methanol-treated silk (M-silk), and glycerol-treated silk (G-silk); and (b) stretchability of E-silk, M-silk, and G-silk in dry and wet states, respectively.

With increasing glycerol concentration in the PEDOT:PSS aqueous solution, it was observed that the amount of β-sheets increased, while the amount of random coil decreased, possibly due to the increased amounts of residual glycerol and water in the silk-based electrodes (FIG. 4). From the IR spectra, it was observed that the band intensity at the range of 3600-3000 cm$^{-1}$ (which corresponds to —OH groups of glycerol and water) increased as the glycerol concentration increased in the PEDOT:PSS aqueous solution (FIG. 4), which suggests an increased amount of residual glycerol and water in the glycerol-stabilised silk electrodes. Simulation results on amorphous domain of silk with glycerol show an increased ratio of extensible secondary structures in water (60.2% random coils and 21.6% turns) compared with in vacuum (54.6% random coils and 8.0% turns) (Table 1). The glycerol-absorbed water molecules can disrupt the hydrogen bonds in the amorphous phase and enhance the chain's mobility, weakening the chain-chain interaction, and thus reducing the Young's modulus. Regardless of the solvent used for treatment, it was observed that a higher water content in silk fibroin significantly improved the stretchability of the silk by at least one order of magnitude (FIG. 5b), but this improvement was observed to be the highest for glycerol-treated silk.

TABLE 1

Molecular dynamics simulation showing the stabilisation and plasticisation mechanisms of silk, and the proportion of various secondary structures under different conditions.

| Secondary structures | Under vacuum | Under water |
|---|---|---|
| Random coils | 54.6% | 60.2% |
| Turns | 8.0% | 21.6% |
| β-sheets | 27.3% | 17.0% |
| Others | 10.2% | 1.1% |

Figure 6:
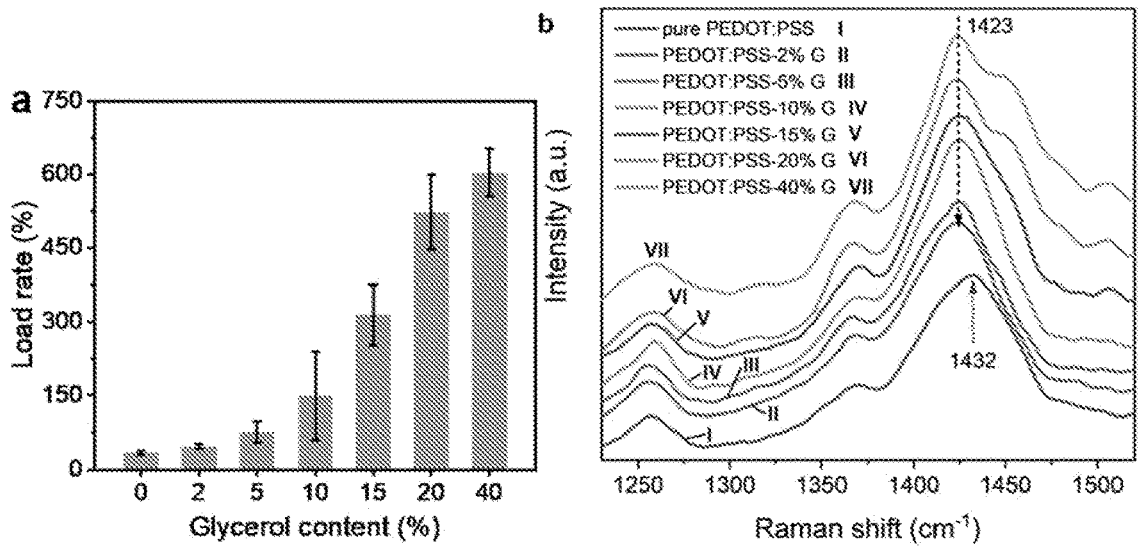
FIG. 6 Depicts: (a) load rate of silk-based electrodes with different glycerol content after moisture balance in ambient environment for 12 h; (b) Raman spectra of PEDOT:PSS with different glycerol content (0-40 vol %) treated by thermal annealing for 15 min; and (c) relative content of various secondary structures of as-spun silk fiber mat, glycerol-treated silk fiber mat (G-silk) and final silk electrode (Silk-P-15G).

Glycerol can absorb moisture from ambient environment and prevent silk from dehydration, and the loaded content of glycerol and water is positively related to the volume of glycerol added in the PEDOT:PSS coating solution (FIG. 6a). Further, the relative ratio of various secondary structures of as-spun silk fiber mat, glycerol-treated silk fiber mat and final silk electrodes with PEDOT:PSS are shown in FIG. 6c.

Figure 2:
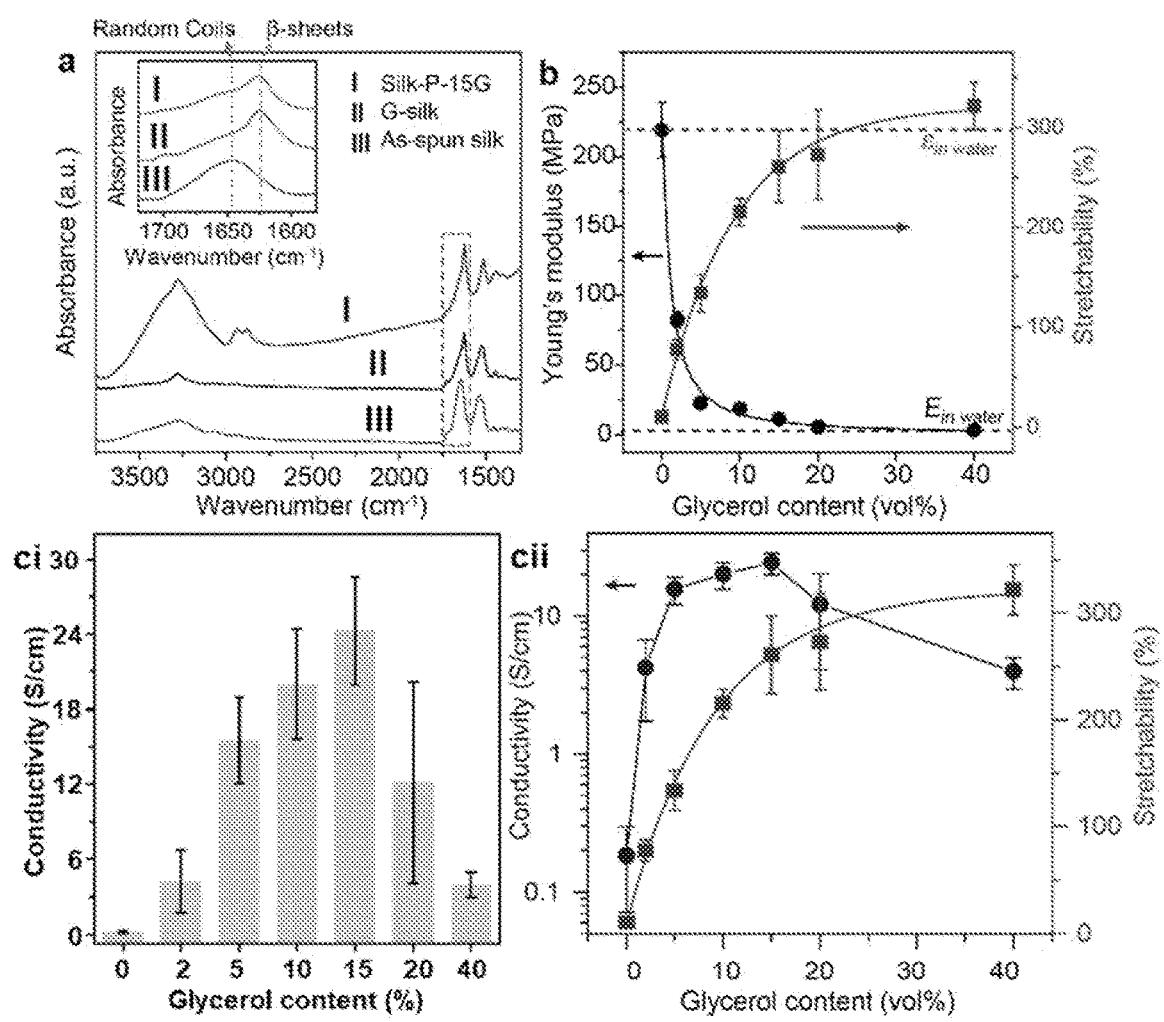
FIG. 2 Depicts: (a) FTIR spectra of as-spun silk, glycerol-stabilised silk (labelled as G-silk), and glycerol stabilised silk coated with PEDOT:PSS which contains 15 vol % glycerol (labelled as Silk-P-15G); (b, ci and cii) the influence of glycerol content in the PEDOT:PSS coating solution on the stretchability, Young's modulus, and conductivity of final silk-based electrodes. Figures ci and cii show the same conductivity in relation to the glycerol content, but in different scales.
Figure 3:
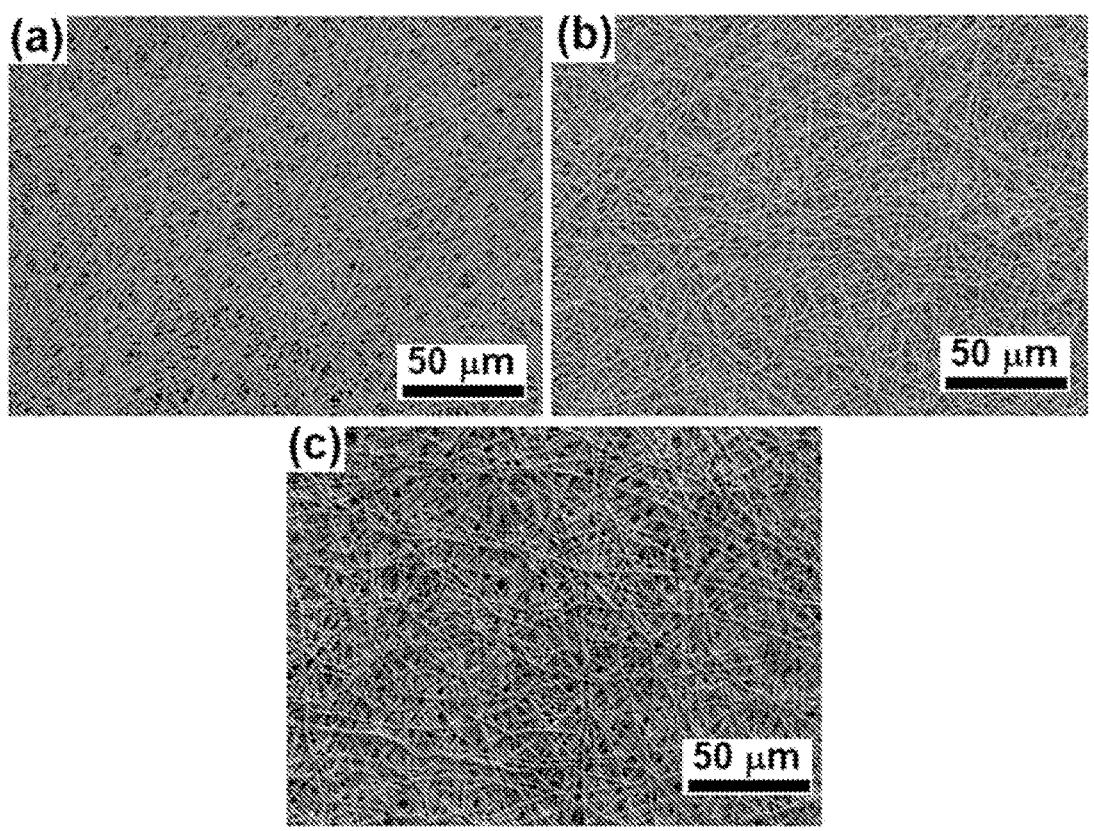
FIG. 3 Depicts SEM images of: (a) as spun silk fiber mat; (b) glycerol-stabilised silk fiber mat; and (c) PEDOT:PSS (with 15 vt % glycerol) coated silk fiber mat.

When the glycerol content in PEDOT:PSS aqueous solution was increased from 0 to 40 vol %, the stretchability of silk-based electrode in ambient conditions increased dramatically from <10% to up to ~340%, while the Young's modulus decreased from ~220 MPa to <3 MPa (FIG. 2b). Glycerol could also lead to a structural reorientation of PEDOT:PSS chains that promotes the coating stability and conductivity of the blend. With the addition of glycerol, the thiophene structure of PEDOT chain changes from benzoid-rich (coil conformation) to quinoid-rich (linear conformation), which can be confirmed by the shift of the strong band assigned to the symmetric $C_\alpha=C_\beta$ stretching vibrations (from 1432 cm$^{-1}$ to 1423 cm$^{-1}$) in the Raman spectra (FIG. 6b). As a result, the conductivity was efficiently enhanced from ~0.18 S/cm (0 vol % glycerol) to ~24 S/cm (15 vol % glycerol) (FIG. 2ci and cii).

However, higher glycerol content would make the electrode too slimy to handle, and decrease the conductivity due to the reduced effective loading of PEDOT:PSS. Given the above, 15 vol % of glycerol doping was determined to be the optimal concentration (labelled as Silk-P-15G for the obtained electrode) to give the highest conductivity, with adequate stretchability and handling. As such, the performance and properties of Silk-P-15G were further evaluated in the following examples, and may denoted as "Silk-P-15G" or "silk-based electrodes" interchangeably.

Example 2. Stretchability and Conductivity of the Silk-Based Electrode of the Current Invention, in Comparison with Other Electrodes To understand the stretchability and conductivity of the silk-based electrode of the current invention (Silk-P-15G from Example 1), the resistance-strain studies on the electrodes were carried out in comparison with other electrodes (i.e. PEDOT:PSS on polymer substrates, silk fiber mat deposited with gold, and silk-based electrodes with high-degree of fiber alignment).

Figure 7:
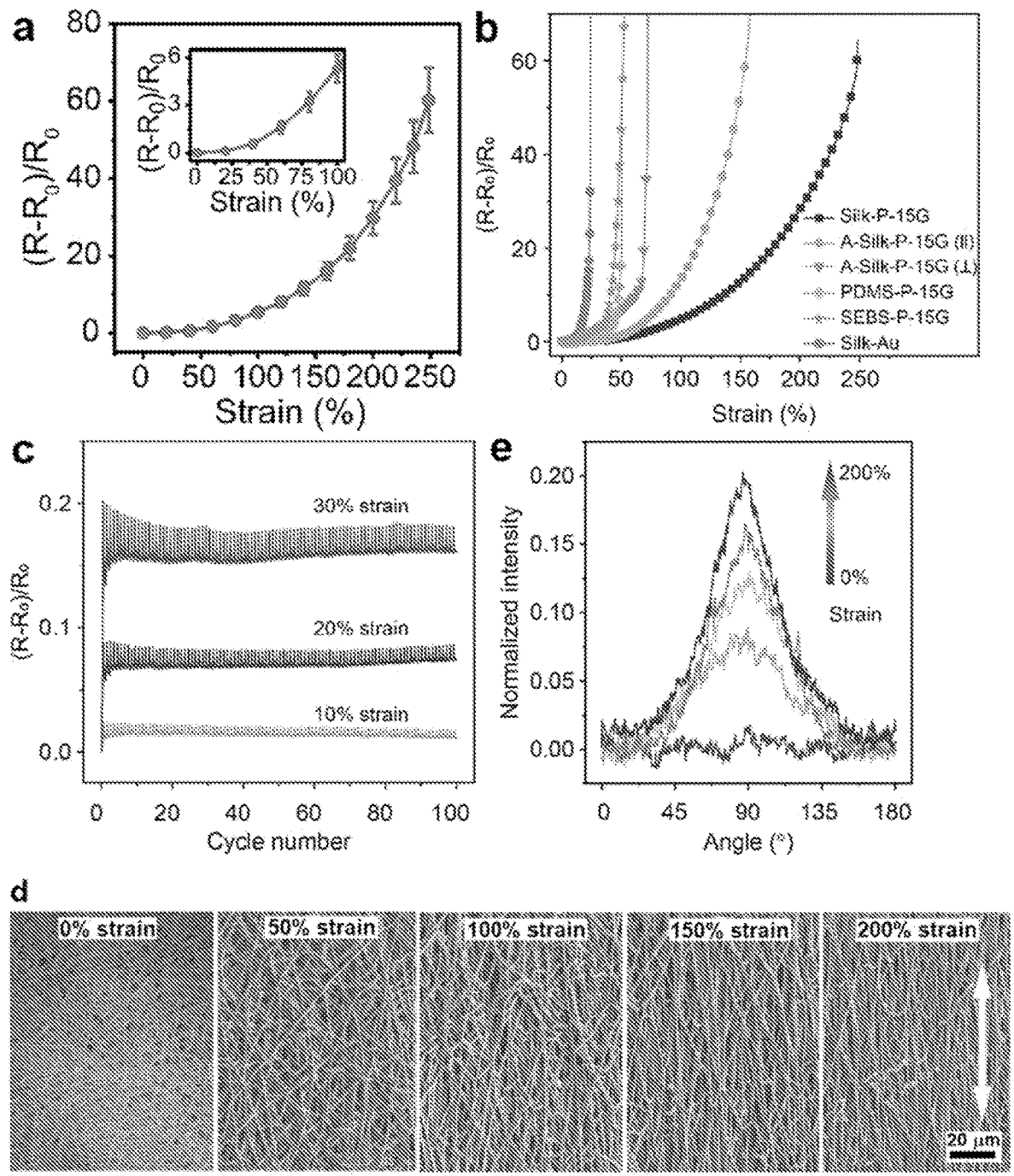
FIG. 7 Depicts the electrical performance and morphology of the breathable, stretchable silk-based electrodes of the current invention: (a) resistance-strain characteristics of Silk-P-15G; (b) comparison of resistance-strain characteristics of Silk-P-15G with other commonly used electrodes; (c) the resistance changes of Silk-P-15G under cyclic 10%, 20%, and 30% strain; (d) SEM images of silk-based electrodes under variable strain, and (e) their corresponding Fast Fourier Transform (FFT) analysis by radial summation of the pixel intensities of FFT SEM images for each degree between 0° and 180°.
Figure 8:
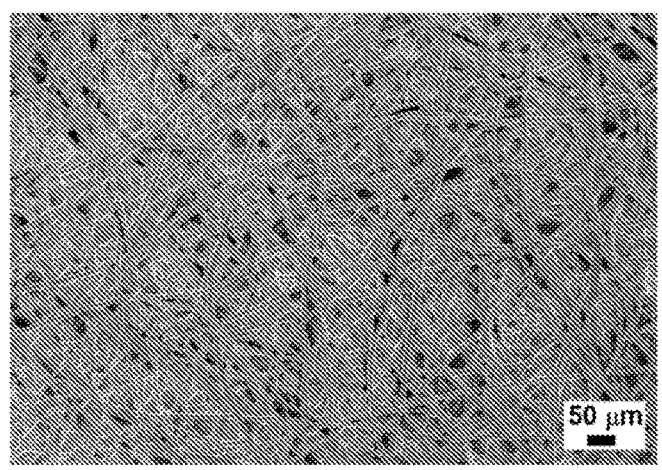
FIG. 8 Depicts a SEM image of silk-based electrode (Silk-P-15G) under cyclic 30% strain for 100 times.

The conductivity of the silk-based electrode (Silk-P-15G) can be maintained up to ~250% strain upon stretching, and a relative low resistance change of ~4 at 100% strain was obtained (FIGS. 7a and b). The changes in the resistance of the electrodes remained stable after 100 strain cycles at 10%, 20%, and 30% strain, showing high cyclic durability (FIG. 7c). Further, no broken fibers and delamination of PEDOT:PSS were observed, which suggests the high mechanical robustness of the porous structures (FIG. 8). Previous reports on PEDOT:PSS based electrodes are not as stretchable as the current silk-based electrodes (J. H. Lee, et al. ACS Appl Mater Interfaces 2018, 10, 28027; S. Cruz, et al. J Mater Sci-Mater El 2017, 28, 2563; J. G. Tait, et al. Sol. Energy Mater. Sol. Cells 2013, 110, 98; K. Wang, et al. Adv Healthc Mater 2017, 6, 1700552). The high stretchability and low resistance change under strain of the silk-based electrodes of the current invention are mainly due to the porous structure and random arrangement of fibers in the electrodes. The porous fiber structures of the silk-based electrode allow more PEDOT:PSS to infiltrate into the substrate, therefore allowing more conducting pathway to be formed even when the electrode is stretched.

For electrodes without porous mesh structures prepared by spin coating PEDOT:PSS on elastic polymer substrates, such as polydimethylsiloxane (PDMS), and styrene-ethylene-butylene-styrene (SEBS), the ultimate electric stretchability obtained were only ~49% and ~48%, respectively. The poorer performance of these electrodes as compared to that of the silk-based electrodes is due to the inability of the PEDOT:PSS to penetrate the non-porous polymer substrates, resulting in the PEDOT:PSS to be distributed only on the surface of the substrates. As such, disconnected cracks were easily formed when the electrodes were stretched, which resulted in lower electric stretchability.

Figure 9:
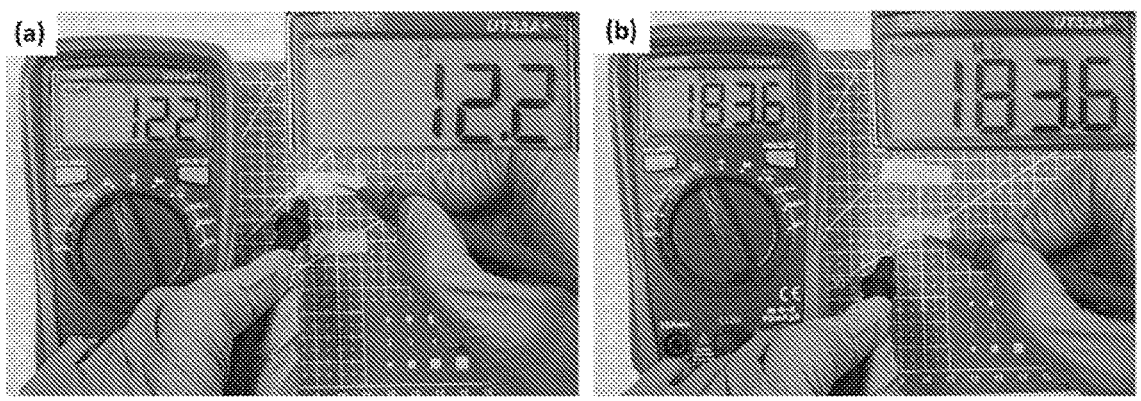
FIG. 9 Depicts the conductivity of: (a) silk fiber mat coated with Au; and (b) Au-coated silk fiber after glycerol plasticisation.

In addition, gold (Au) mesh electrode was prepared by depositing Au on as-spun silk fiber mat (labelled as Silk-Au) and the ultimate strain obtained was only ~24%, which is similar to the reported Au mesh-based electrode on electrospun poly(vinyl alcohol) (PVA) fiber mat (A. Miyamoto, et al. Nat. Nanotechnol. 2017, 12, 907). Interestingly, after glycerol plasticisation, the resistance of the Silk-Au electrode increased dramatically by up to hundreds of MΩ magnitude and became almost non-conductive (FIG. 9), which is due to the hydration-induced expansion of fibers. Similar to the polymer substrate described above, the Silk-Au electrodes with non-infiltrated metal surface also tend to form disconnected cracks during stretching. As such, the electric stretchability of these electrodes are lower than that of the silk-based electrodes of the current invention.

Figure 10:
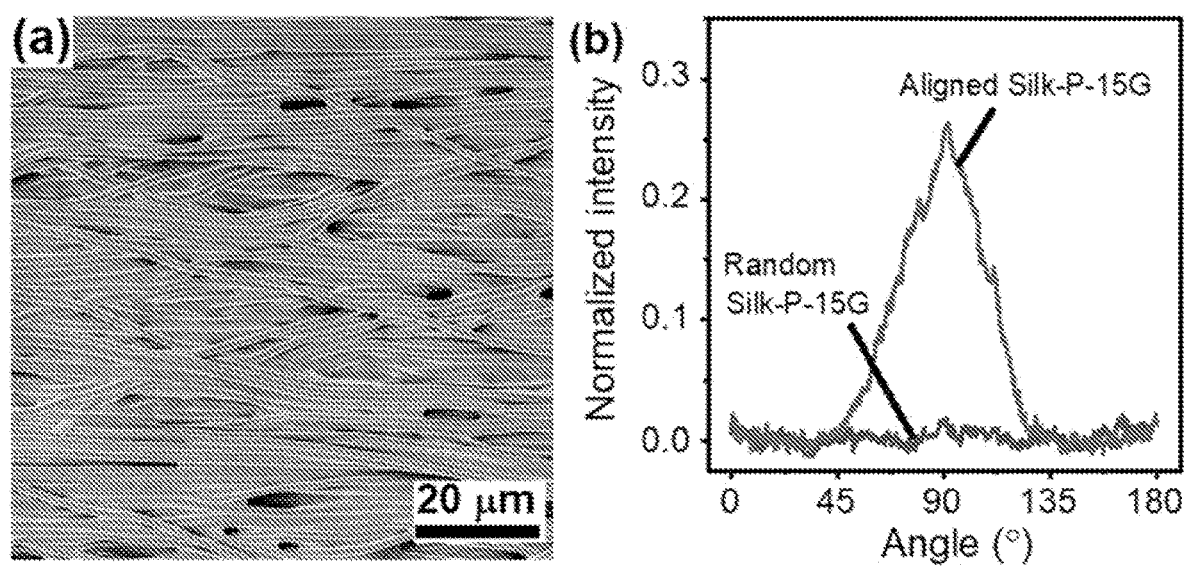
FIG. 10 Depicts: (a) SEM image of silk-based electrode with aligned silk fibers (Aligned Silk-P-15G); and (b) the corresponding quantitative analysis of the SEM images by Fast Fourier Transform (FFT) analysis.

To demonstrate the importance of the random fiber structures in improving the stretchability of the electrodes, silk-based electrodes with high-degree fiber alignment (labelled as "A-Silk-P-15G" or "Aligned-Silk-P-15G", as shown in FIGS. 7b and 10) were tested in bidirectional stretch conditions. It was observed that the resistance changed much faster and electrical performance no longer maintained at ~160%, and ~70% strain when being stretched along, and perpendicular to the fiber direction, respectively (FIG. 7b). Specifically, the electrical resistance increased sharply at 160% and 75% when strain was applied parallel and perpendicular to the fiber direction, respectively (FIG. 7b). To reach a resistance change ($\Delta R/R_0$) of ~40, the strain ($S_{40}$)

applied on the electrodes with aligned fibers (A-Silk-P-15G) parallel and perpendicular to the fiber direction were ~70% and ~140%, respectively, which were much lower than the ~225% stain applied on the electrode of the current invention (i.e. with random fibers).

Scanning electron microscope (SEM) images of the silk-based electrodes of the current invention show that during stretching, the fibers tend to slip and realign in the strain direction (FIG. 7d). With further stretch of up to 200% strain, most of the fibers were realigned and stretched in the strain direction without obvious breaking down. Quantitative analysis by Fast Fourier Transform (FFT) of the SEM images also confirms that with higher strain, the fibers show a higher degree of orientation in the direction of stretching (FIG. 7e). Morphological observations agree well with the electrical performance under strain, which further prove that both random mesh structures and infiltrated compliant conducting polymer contribute to the high stretchability of our silk fiber mats-based electrodes.

Example 3. Thermal Insulation, Evaporative Resistance and Water Vapour Transmission Rates (WVTRs) of the Silk-Based Electrodes of the Current Invention, in Comparison with Conventional Electrodes Besides the high stretchability and low Young's modulus, good thermal-wet comfort and high water-vapour permeability of electrodes are also important for physiological comfort for daily use, especially during exercise.

Human body can exchange heat through several pathways like dry heat exchange (conduction, convection, and radiation) and evaporation. Thermal insulation of electrodes will decrease the dry heat transfer between local skin and external ambient environment. Sweat evaporation from skin serves as the principle way in which the human body maintains thermal equilibrium in sweaty conditions. Accordingly, the resistance to evaporative heat transfer from skin to the environment can be determined by the evaporative resistance of electrodes. Thermal insulation and evaporative resistance are important indices to determinate thermal-wet comfort and have been widely used for evaluating the physiological comfort of textiles and clothing.

As such, these properties of the silk-based electrodes of the current invention (Silk-P-15G) were studied with reference to international standards ISO 15831 and ASTM F2370, using a 34-zone sweating thermal manikin 100 as shown in FIG. 11a (a photo and detailed zone divisions are shown in FIG. 12, and described in the general method "Measurement of thermal insulation and evaporative resistance of electrodes"; references: M. R. Mitchell, et al. *J. Test. Eval.* 2007, 35, 100707; G. Song, S. Mandal, in *Performance Testing of Textiles: Methods, Technology and Applications* (Ed: L. Wang), Woodhead Publishing, Oxford, United Kingdom 2016, Ch. 3). The surface temperature and simulated sweating rate can be separately controlled in each zone. Further, the shape and heat capacity of the manikin are highly similar to those of a real human body, which allows the transient response of the manikin to the wearing textiles and clothing to be very close to that of a real human. Given this, the manikin setup can effectively and quantitatively determine the thermal-wet comfort properties of the as-prepared electrodes of the current invention.

FIG. 11b shows that commercial gel electrode has the highest thermal insulation value of ~0.16° C.·m$^2$·W$^{-1}$ due to the thick encapsulation layer, which is an airtight polyethylene terephthalate (PET) layer to prevent the hydrogel from dehydrating. For the silk-based electrode of the current invention (Silk-P-15G), which has the same thickness as the polymer (SEBS) film electrode, a comparable value of thermal insulation with the blank condition was observed, due to its porous structures. This demonstrates that the silk-based electrode of the current invention has the least negative effect on the dry heat exchange at the skin surface.

Figure 13:
FIG. 13 Depicts the small contact angle of the silk-based electrode (Silk-P-15G) of the current invention, demonstrating the highly hydrophilic property of the electrode.
Figure 13:
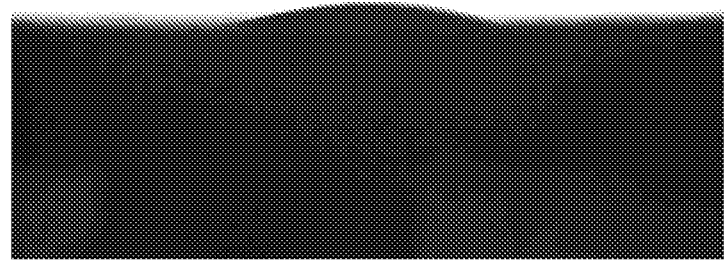

For evaporative resistance, it was observed that the silk-based electrodes (Silk-P-15G) invention show an overwhelming performance over the commercial gel electrodes and SEBS polymer electrodes (FIG. 11c). Typically, the evaporative resistance values of commercial gel and SEBS polymer electrodes were all higher than 300 Pa·m$^2$·W$^{-1}$ (FIG. 11c), which means that almost no evaporation of sweat could occur when the electrodes were laminated on skin. However, the evaporation resistance for the silk-based electrode of the current invention was only ~23 Pa·m$^2$·W$^{-1}$, comparable to that of naked manikin skin (~11 Pa·m$^2$·W$^{-1}$). This is due to the highly hydrophilic property of the silk-based electrode (as illustrated by the small contact angle in FIG. 13) and the porous structures, which allow easy transportation of sweat through the electrode mats and away from the skin (via strong capillary force).

In addition, high water vapour permeability is another parameter for determining the comfort level of an electrode or electronic device on skin (Q. Qiu, et al. *Nano Energy* 2019, 58, 750). To quantitatively demonstrate the excellent water vapour permeability of the silk-based electrodes, water vapour transmission rates (WVTRs) at 20° C. and 37° C., which mimic the comfortable and heavy sweating conditions of human bodies, respectively, were measured. Under both conditions, the WVTRs of the silk-based electrodes (~53 g·m$^{-2}$·h$^{-1}$ and ~117 μm$^{-2}$·h$^{-1}$ at 20° C. and 37° C., respectively) were observed to be higher than the transepidermal water loss (TEWL) of the skin of adults under normal (TEWL$_{skin}$=~5-10 g·m$^{-2}$·h$^{-1}$) and exercise states (TEWL$_{skin}$=~6-66 g·m$^{-2}$·h$^{-1}$) (M. Cao, et al. *IEEE Comput. Graph. Appl.* 2016, 36, 70; J. Nikolovski, et al. *J. Invest. Dermatol.* 2008, 128, 1728; and K. I. Jang, et al. *Nat. Commun.* 2014, 5, 4779). The WVTRs of the current invention also exceed those of the commercial and SEBS polymer electrodes as shown in FIG. 11d. This indicates that the loss of water vapour and sweat evaporation at the skin surface would not be blocked by the electrodes of the current invention, under normal and even sweaty conditions. This allows the skin to breathe, with minimal impact on the normal metabolism of the skin.

Based on the above experimental tests, the thermal-wet comfort of the silk-based electrodes are demonstrated to be more comfortable and suitable for use under sweaty conditions, as compared to conventional electrodes. The advantages of the silk-based electrodes in real-time skin electrophysiological measurement under sweaty conditions are shown in Example 4.

Example 4. Performance of the Silk-Based Electrodes of the Current Invention in Recording On-Skin Electrophysiological Signals Under Different Body Conditions, in Comparison with Conventional Electrodes The good skin conformability and thermal-wet comfort of the silk-based electrode (Silk-P-15G) were further demonstrated by on-skin electrophysiological signals recording, under different conditions (i.e. resting and sweaty conditions).

Figure 14:
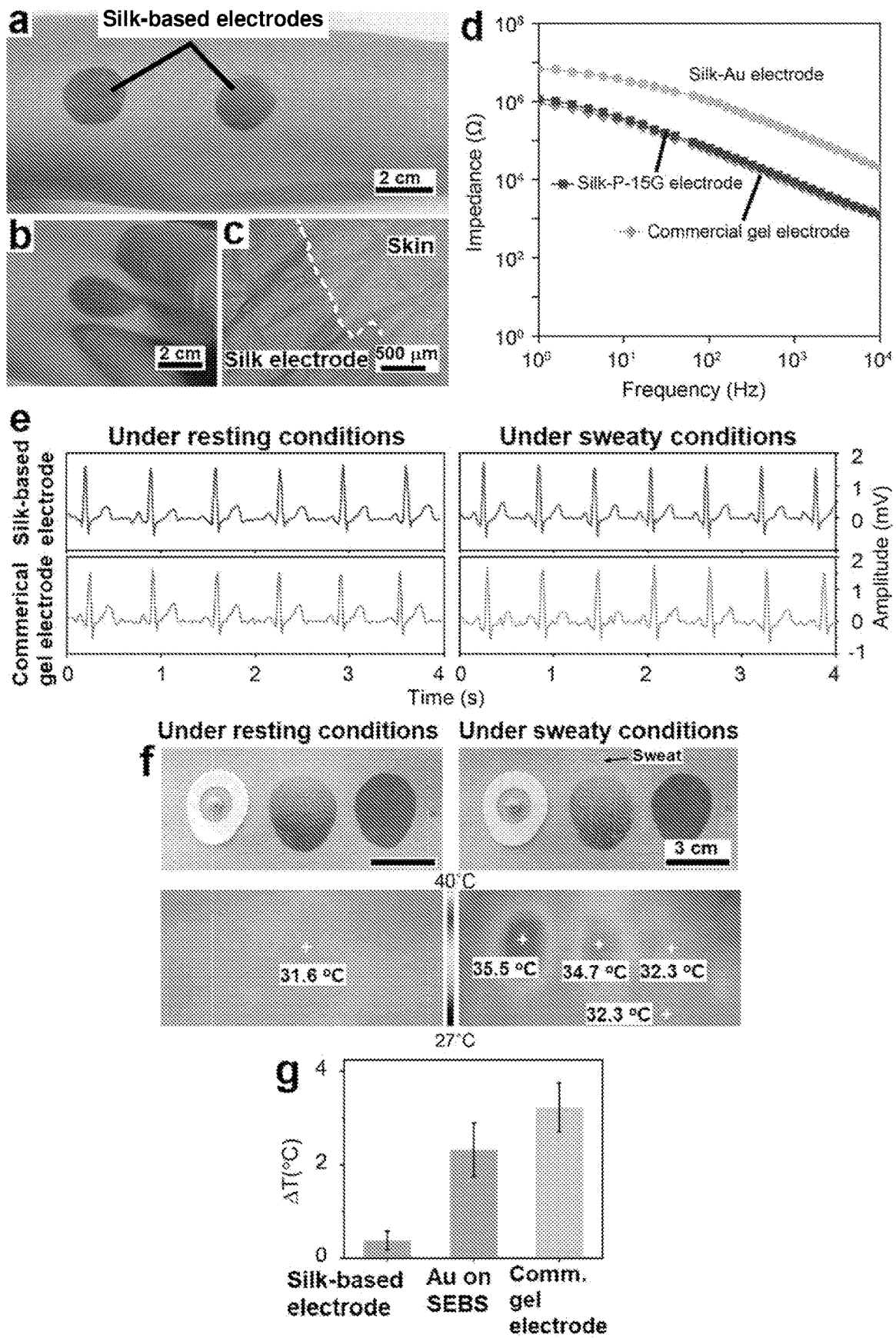
FIG. 14 Depicts the on-skin electrophysiological monitoring using the silk-based electrodes of the current invention under different conditions: (a) a photo of the silk-based electrodes (Silk-P-15G) laminated on a human forearm at normal, and (b) wrinkling state; (c) an optical microscope image showing the conformability of the silk-based electrode (Silk-P-15G) to the irregular structure of the human skin; (d) on-skin interfacial impedance of the silk-based electrode (Silk-P-15G) in comparison with commercial gel electrodes and Silk-Au electrodes; (e) ECG signals recorded by silk-based and commercial electrodes before and after exercise (i.e. resting and sweaty conditions, respectively); (f) optical and infrared photos of various electrodes on skin before and after exercise (i.e. resting and sweaty conditions, respectively) to demonstrate good thermal transmission of silk-based electrodes (left to right: commercial gel electrode, Au electrode on SEBS polymer substrate and Silk-P-15G); and (g) central temperature variation of the skin in contact with various electrodes, compared with the temperature of surrounded naked skin after exercise.
Figure 15:
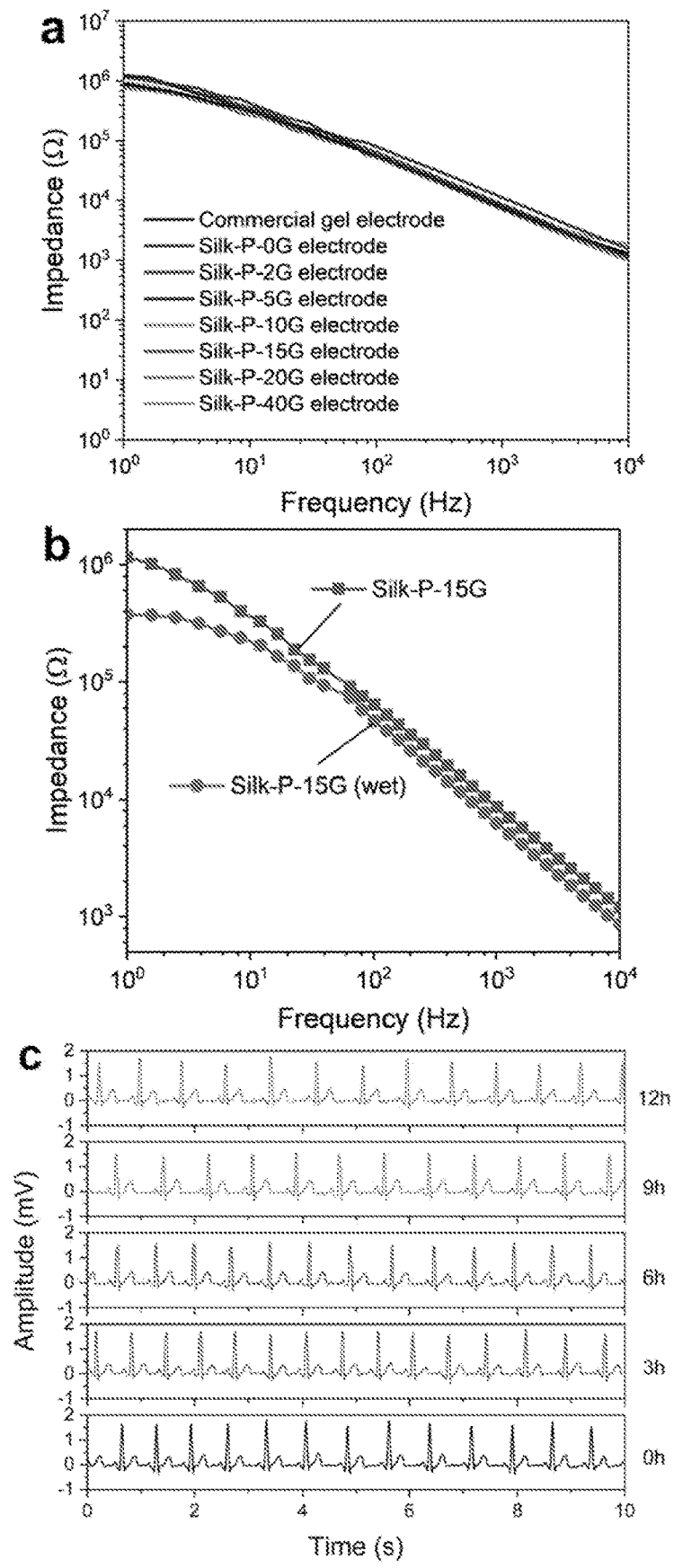
FIG. 15 Depicts: (a) on-skin impedance of all silk-based electrodes of the current invention with different glycerol contents; (b) on-skin impedance of Silk-P-15G as attached and after wetted; and (c) long-term ECG signals recorded by Silk-P-15G during normal daily activities.

The silk-based electrodes on the forearm skin show high skin conformality under compression and deformation (FIGS. 14a and b). The microscopic image also shows no difference in microstructures from naked skin (FIG. 14c). Further, the silk-based electrodes exhibit low interfacial impedance with skin, which is comparable to that of the commercial ionic gel electrode, and lower than that of Au mesh electrode (FIGS. 14d and 15a). The low interfacial impedance and high skin conformality are crucial for the signal integrity and sensitivity in electrophysiological measurement. The electrocardiography (ECG) signals were collected under calm/resting state, and sweaty state (after running) to demonstrate the sweat tolerance.

Before exercise (calm/resting state), the detected ECG signals have comparable amplitudes with the signals collected by commercial gel electrodes (FIG. 14e). The P-waves, QRS complexes, and T-waves could be explicitly recognized in both cases. However, after wearing the electrodes and running, noisy peaks arising in the ECG signals collected by commercial gel electrodes were observed, while the signals acquired by the silk-based electrodes remained unaffected, demonstrating a higher stability with less fluctuation (i.e. better to signal-to-noise ratio). This is because the commercial electrodes are impermeable with airtight hydrogel or covers, resulting in a sweat film to be formed between the skin and ionic hydrogel. This sweat film will disable the adhesion of the commercial electrode, which decreases its conformality and signals fidelity. In contrast, the silk-based electrodes are porous and air-permeable, which allow the sweat to permeate and evaporate easily. As such, no detachment of the silk-based electrode was observed on the sweaty skin. In addition, it was observed that the interfacial impedance decreased after the silk-based electrode became wet (FIG. 15b). Therefore, the signals were minimally affected by sweat during exercise, showing excellent sweat tolerance of the silk-based electrode. In addition, the silk-based electrodes are thin and cannot be easily felt by skin, and therefore, would not cause discomfort and distraction to athletes during real-time healthcare monitoring.

The breathability of the silk-based electrodes also prevents thermal insulation of electrodes and sweat accumulation during exercise. Thermal insulation of electrodes is the key factor causing discomfort when wearing electrodes on skin during exercise. As a result of the thin layer and porous structures of the current silk-based electrodes, good thermal transmission was observed when it was attached on the skin. No obvious temperature variation was observed between skin wearing the silk-based electrode (Silk-P-15G) and adjacent naked skin (FIG. 14f), suggesting good heat dissipation. However, it was observed that the temperatures at skin areas wearing the polymer electrode and a commercial gel electrode increased by ~2.3° C. and ~3.1° C., respectively (FIGS. 14f and 14g).

Given the above, the silk-based electrode of the current invention provides superior physiological comfortability, as compared to commonly used commercial electrodes and polymer electrodes. This is important for healthcare monitoring during sports/strenuous activities, and under sweaty conditions. In addition, the silk-based electrodes are able to obtain stable ECG signals for long-term wearing (at least up till 12 h) during normal daily activities (FIG. 15c), which allows accurate health-related information to be obtained for future intelligent diagnostics.

The invention claimed is:

1. An electrode material comprising:
   a non-woven silk-fibroin mesh substrate;
   glycerol; and
   a conductive polymeric material, wherein:
      40-65% of the silk-fibroin in the non-woven mesh substrate is in the form of β-sheets; and
      the electrode material is stretchable; and
   wherein the non-woven silk-fibroin mesh substrate is porous and has a top surface and a bottom surface and an interior portion formed by a plurality of silk-fibroin fibers attached to one another in a random fashion,
   wherein the non-woven silk-fibroin mesh substrate has a plurality of pores in the top surface, bottom surface and throughout the interior portion,
   wherein the silk-fibroin fibers in the top surface, the bottom surface and at least part of the interior portion are coated with the glycerol and the conductive polymeric material, and the glycerol and conductive polymeric material are found in at least a portion of the plurality of pores, and
   wherein the water vapour transmission rate (WVTR) is:
      from 40 to 60 g·m2·h-1 when measured at 20° C. using ASTM E96-95; or
      from 100 to 130 g·m2·h-1 when measured at 37° C. using ASTM E96-95.

2. The electrode material according to claim 1, wherein the conductive polymeric material is selected from the group consisting of poly(3,4-ethylenedioxythiophene) polystyrene sulfonate (PEDOT: PSS), polythiophene (PTh), polyaniline (PANI), polypyrrole (PPy), polyacetylene (PA), poly (paraphenylene) (PPP), and polyfuran (PF).

3. The electrode material according to claim 1, wherein the conductivity of the electrode material is from 12 to 30 S/cm.

4. The electrode material according to claim 1, wherein a strain can be applied to the electrode material to stretch it to from 100 to 400% above its original size along any dimension.

5. The electrode material according to claim 4, wherein a strain can be applied to the electrode material to stretch it to from 150 to 350% above its original size along any dimension.

6. The electrode material according to claim 4, wherein the electrode material maintains conductivity during and/or after stretching.

7. The electrode material according to claim 6, wherein the electrode material has a ΔR/R0 of from 2 to 10 when a strain is applied to the electrode material that stretches it to 100% above its original size along any dimension.

8. The electrode material according to claim 6, wherein the electrode material maintains its conductivity during and after 100 strain cycles, where the strain applied to the electrode material stretches it to 30% above its original size along any dimension.

9. The electrode material according to claim 1, wherein the evaporative resistance of the electrode material is from 11 to 30 Pa·m2·W-1 when measured using ASTM F2370-10.

10. The electrode material according to claim 1, wherein the electrode material has a Young's modulus of from 0.1 to 25 MPa.

11. The electrode material according to claim 1, wherein the weight of a material loaded onto the non-woven silk-fibroin mesh substrate is from 40 to 700% more than the weight of the dry non-woven silk-fibroin mesh substrate when the non-woven silk-fibroin mesh substrate is in a dry form, where:

the weight of the material loaded onto the non-woven silk-fibroin mesh substrate is measured after a period of 12 hours in an ambient atmosphere following completion of an annealing step conducted on the electrode material, said annealing step involving heating the electrode material to a temperature of from 100 to 150° C. for a period of from 5 to 30 minutes; and the material loaded onto the non-woven silk-fibroin mesh substrate comprises the glycerol and the conductive polymeric material.

* * * * *